US012670431B2

(12) United States Patent (10) Patent No.: US 12,670,431 B2
Neumann (45) Date of Patent: Jun. 30, 2026

(54) METHOD FOR AND SYSTEM FOR ARRANGING CONSUMABLE ELEMENTS WITHIN A DISPLAY INTERFACE

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 389 days.

(21) Appl. No.: 17/514,453

(22) Filed: Oct. 29, 2021

(65) Prior Publication Data

US 2022/0138629 A1 May 5, 2022

Related U.S. Application Data

(63) Continuation-in-part of application No. 17/365,706, filed on Jul. 1, 2021, now Pat. No. 11,694,121, which is a continuation of application No. 17/087,745, filed on Nov. 3, 2020, now Pat. No. 11,100,430.

(51) Int. Cl.

| | |
|---|---|
| *G06N 20/00* | (2019.01) |
| *G06F 16/2457* | (2019.01) |
| *G06F 18/2113* | (2023.01) |
| *G06F 18/214* | (2023.01) |
| *G06F 18/22* | (2023.01) |
| *G06F 18/2413* | (2023.01) |

(52) U.S. Cl.
CPC ....... *G06N 20/00* (2019.01); *G06F 16/24578* (2019.01); *G06F 18/2113* (2023.01); *G06F 18/214* (2023.01); *G06F 18/22* (2023.01); *G06F 18/2414* (2023.01)

(58) Field of Classification Search
CPC .......... G06N 20/00; G06N 7/01; G06N 20/10; G06N 5/01; G06F 16/24578; G06F 18/2113; G06F 18/214; G06F 18/22; G06F 18/2414; G06F 18/24; G06F 18/40; G06K 9/6215; G06K 9/623; G06K 9/6256; G06K 9/6273; G06Q 30/0641; G06Q 30/0201; G06Q 30/0631; G06Q 50/12; G16H 20/60; G16H 50/20; G06V 10/762; G06V 10/764; G06V 10/774; G06V 10/82
See application file for complete search history.

(56) References Cited

U.S. PATENT DOCUMENTS

| | | | |
|---|---|---|---|
| 9,898,788 B1 | 2/2018 | Calargun et al. | |
| 2018/0233064 A1* | 8/2018 | Dunn | G09B 19/0092 |
| 2018/0240542 A1* | 8/2018 | Grimmer | A61P 25/00 |

* cited by examiner

*Primary Examiner* — Ruiping Li
(74) *Attorney, Agent, or Firm* — Caldwell LLC

(57) ABSTRACT

A system and method for arranging consumable elements within a display interface, the system including a computing device configured to receive a first consumable element; calculate a first consumable score as a function of the first consumable element; receive a second consumable element; calculate a second consumable score as a function of the second consumable element; and arrange the first consumable element and the second consumable element within a display interface as a function of a ranking process.

18 Claims, 10 Drawing Sheets

200

Computing Device 104

First Consumable Element 208

Second Consumable Element 216

Nutritional Impact 224

Representative Profile 204

First Consumable Score 212

Second Consumable Score 220

Display Interface 228

300

805 — Receiving a Biological Extraction and an Alimentary Element Order History of a User 810 — Determining an Alimentary Profile 815 — Identifying a First Simulated Alimentary Element and a Second Simulated Alimentary Element 820 — Generating a Representation of the First Simulated Alimentary Element and the Second Simulated Alimentary Element

800

METHOD FOR AND SYSTEM FOR ARRANGING CONSUMABLE ELEMENTS WITHIN A DISPLAY INTERFACE

CROSS-REFERENCE TO RELATED APPLICATIONS

This application is a continuation-in-part of Non-provisional application Ser. No. 17/365,706 filed on Jul. 1, 2021 and entitled "METHOD FOR AND SYSTEM FOR PREDICTING ALIMENTARY ELEMENT ORDERING BASED ON BIOLOGICAL EXTRACTION," which is a continuation of Non-provisional application Ser. No. 17/087,745 filed on Nov. 3, 2020, and entitled "METHOD FOR AND SYSTEM FOR PREDICTING ALIMENTARY ELEMENT ORDERING BASED ON BIOLOGICAL EXTRACTION," each of the Non-provisional application Ser. No. 17/365,706 and Non-provisional application Ser. No. 17/087,734 is hereby incorporated by reference herein in its entirety.

FIELD OF THE INVENTION

The present invention generally relates to the field of machine-learning. In particular, the present invention is directed to systems and methods for arranging consumable elements within a display interface.

BACKGROUND

Alimentary element originators often provide alimentary elements for dine-in, take-out, and delivery. Individuals may interact with an alimentary maker via a device such as a computer or smartphone to place an order. One caveat with customer ordering with alimentary element take-out and delivery services is time lag involved in the process. Individuals may place orders when a need for the order arises, but alimentary elements may not arrive until long after. Furthermore, individuals may wade through a variety of options that are not beneficial to the user and locating suitable alimentary elements and alimentary element originators may be difficult.

SUMMARY OF THE DISCLOSURE

In an aspect, a system for arranging consumable elements within a display interface, the system including a computing device configured to receive a first consumable element; calculate a first consumable score as a function of the first consumable element; receive a second consumable element; calculate a second consumable score as a function of the second consumable element; and arrange the first consumable element and the second consumable element within a display interface as a function of a ranking process. In another non-limiting aspect, a method of arranging consumable elements within a display interface, the method including receiving by a computing device a first consumable element; calculating by the computing device a first consumable score as a function of the first consumable element; receiving by the computing device a second consumable element; calculating by the computing device a second consumable score as a function of the second consumable element; and arranging by the computing device the first consumable element and the second consumable element within a display interface as a function of a ranking process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for predicting alimentary element ordering based on biological extraction. Embodiments may perform alimentary element predictions based on a user's biological extraction and alimentary element order chronicle and suggest predicted alimentary elements based on predictions. In an embodiment, computing device may locate alternative alimentary elements based on classifying alimentary element metrics in the predicted alimentary elements, wherein the alternative alimentary element is more beneficial to a user's biological extraction parameters.

Figure 1:
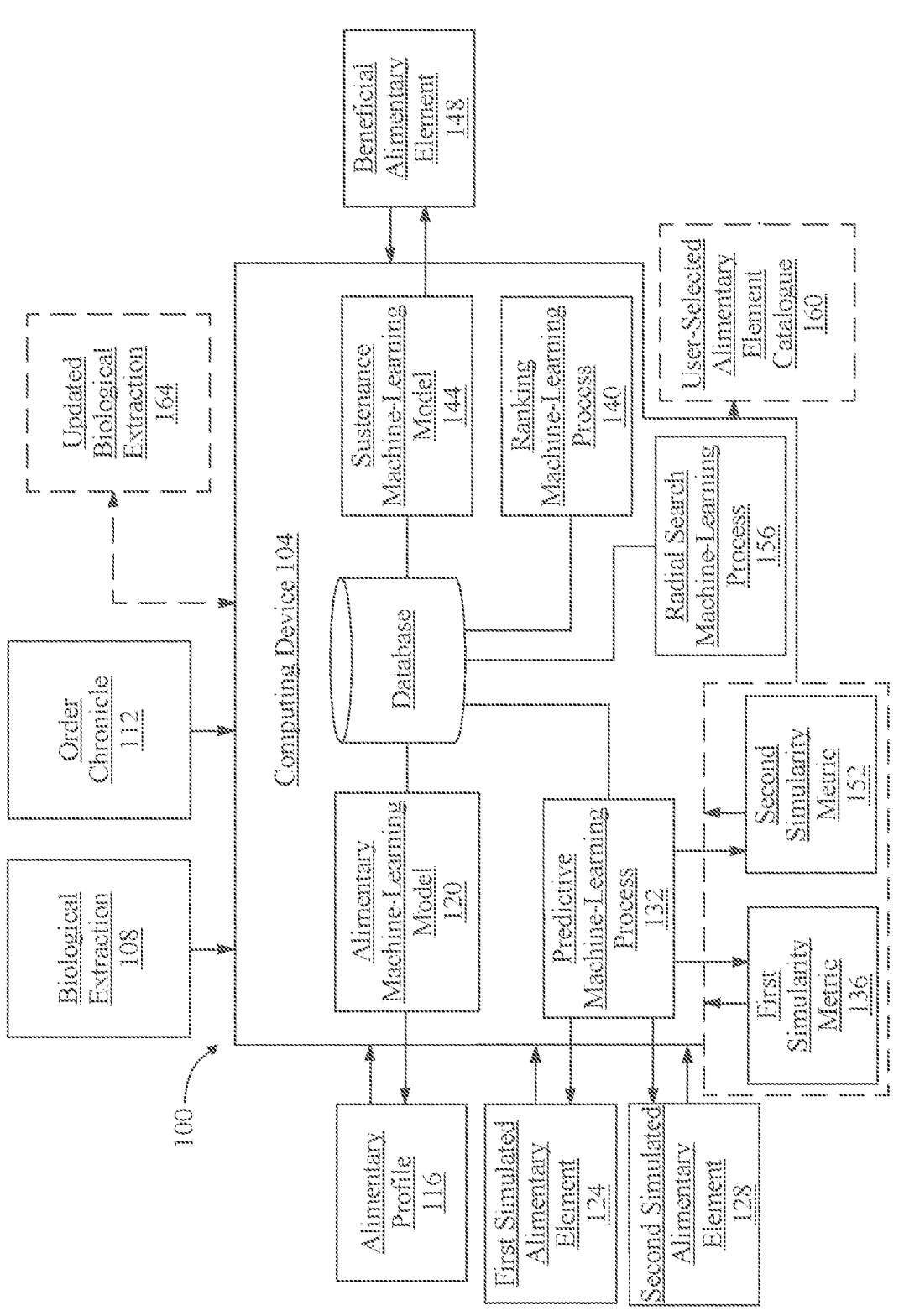
FIG. 1 is a block diagram illustrating an exemplary embodiment of a system for predicting alimentary element ordering based on biological extraction.

Referring now to FIG. 1, an exemplary embodiment of a system 100 predicting alimentary element ordering based on biological extraction is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 is configured to receive a biological extraction of a user. A "biological extraction," as used in this disclosure, is any biological, chemical, physiological, etc. data that is associated with the user. Biological extraction 108 data may include medical histories, diseases, surgeries, injuries, symptoms, exercise frequency, sleep patterns, lifestyle habits, and the like, that may be used to inform a user's diet. Biological extraction 108 data may include diet information such as nutrition deficiencies, food intolerances, allergies, and the like. Biological extraction 108 data may alternatively or additionally include a plurality of dimensions of biological extraction 108 data any data used as a biological extraction as described in U.S. Nonprovisional application Ser. No. 16/886,647, filed on May 28, 2020, and entitled "METHODS AND SYSTEMS FOR DETERMINING A PLURALITY OF BIOLOGICAL OUTCOMES USING A PLURALITY OF DIMENSIONS OF BIOLOGICAL EXTRACTION USER DATA AND ARTIFICIAL INTELLIGENCE," the entirety of which is incorporated herein by reference.

Continuing in reference to FIG. 1, computing device 104 is configured to receive an alimentary element order chronicle. An "order chronicle," as used in this disclosure is a chronological history of transactions associated with a user involving alimentary elements. An "alimentary element," as used in this disclosure, is a meal, grocery item, food element, nutrition supplement, edible arrangement, or the like, that may be generated by an alimentary element originator. An "alimentary element originator," as used in this disclosure, is a restaurant, cafeteria, fast food chain, grocery store, food truck, farmer's market, proprietor, convenience store, deli, or any place that may provide an alimentary item. An alimentary element originator, as used in this disclosure, may be simply referred to as 'originator'. An order chronicle 112 may include all alimentary elements a user may have ordered via a mobile app, web-browser, in-person, via phone, or any other method, for take-out, dine-in, and/or delivery. An order chronicle 112 may include all alimentary elements a user may have obtained at a grocery store. An order chronicle 112 may include a chronological history wherein the dates and times of alimentary elements a user has ordered and/or otherwise obtained is included in the order chronicle.

Continuing in reference to FIG. 1, receiving the alimentary element order chronicle 112 may include generating training data using the alimentary element order chronicle 112 to train the alimentary element machine-learning model to identify user alimentary element patterns. Order chronicle 112, as used herein for system 100, may include data regarding user alimentary element patterns. As used in this disclosure, "user alimentary element patterns," may include patterns, heuristics, behaviors, or any other relationships, that computing device 104 may make concerning the data in the order chronical of a user. An alimentary element patterns may include data that indicates a user preferably orders a particular type of alimentary element or from a particular originator, for instance a fast-food originator, only during particular times, such as during evenings, on weekends, etc. An alimentary element patterns may include a pattern that a user avoids alimentary elements containing a particular ingredient, such as tree nuts, lactose, etc. As used in this disclosure, an alimentary element pattern may be simply referred to as an "order behavior" and/or "order pattern."

Continuing in reference to FIG. 1, computing device 104 is configured to retrieve an alimentary profile. Computing device 104 may retrieve an alimentary profile via a database, such as a NoSQL database and/or any relationship database, online research repository, or the like. Computing device 104 may retrieve an alimentary profile using a machine-learning process, as described herein, wherein the machine-learning process may know to retrieve an alimentary profile, data relating to an alimentary profile and/or a plurality of alimentary profile to perform a function, as described herein. Retrieval of an alimentary profile may include using a machine-learning process, such as a predictive machine-learning process, to retrieve the alimentary profile, as described in further detail below.

Continuing in reference to FIG. 1, computing device 104 is configured to determine an alimentary profile, wherein determining the alimentary profile includes generating an alimentary element model. An "alimentary profile," as used in this disclosure, is a collection of data that described a user's ordering behaviors as it relates to relationships between the content of a user's ordering history and the user's biological extraction data. For instance, an alimentary profile 116 may be a profile that indicates a user has a plurality of allergies and/or intolerances present from data in a biological extraction, and that the user has acknowledged an allergy by avoiding certain alimentary elements. Additionally, an alimentary profile 116 may include relationships that indicate a user exhibits ordering behavior, alimentary element patterns, and the like, according to their order chronicle 112, that they prefer alimentary elements that do not benefit their health, according to biological extraction 108 data.

Continuing in reference to FIG. 1, determining the alimentary profile using an alimentary machine-learning model includes training the alimentary machine-learning model with training data that includes a plurality of entries wherein each entry relates user biological extraction 108 to alimentary element order chronicle 112. Training data may originate from the data present in a user's biological extraction and a user's order chronicle, as described above. An alimentary machine-learning model may be generated by a computing device 104 performing a machine-learning algorithm and/or process by using a machine-learning module, as described in further detail below. Training alimentary machine-learning model 120 with training data may result in a model that contains a variety of qualitative and/or quantitative patterns, heuristics, or the like, that describe relationships between biological extraction 108 and alimentary element order chronicle 112. In non-limiting illustrative examples, alimentary machine-learning model 120 may contain a plurality of individual functions, vectors, matrices, and the like, which describe individual user ordering behaviors as it relates to biological extraction data. In further non-limiting illustrative examples, alimentary machine-learning model 120 may be used by computing device 104 to determine an alimentary profile 116 using the plurality of individual functions, vectors, matrices, and the like, wherein the computing device 104 may include all the patterns, correlations, and/or heuristics into a single profile. Alimentary profile 116 may be used as a reference profile which computing device 104 may use as a rubric for determining alimentary elements which correspond to alimentary elements a user would preferentially order and/or alimentary elements that may benefit a user's health.

Continuing in reference to FIG. 1, computing device 104 may generating the alimentary profile as a function of the alimentary machine-learning model. Model may include at least a mathematical relationship between user alimentary element patterns and user biological extraction 108 data, wherein the mathematical relationship describes how user alimentary element patterns affect user biological extraction 108 parameters. For instance and without limitation, an alimentary profile 116 may include data that demonstrates that a user's biological extraction 108 data such as a history of high blood pressure and elevated resting heart rate may be correlated to an order chronicle of alimentary elements that are high sodium, such as smoked, cured, salted, and/or canned meat, poultry, fish, bacon, cold cuts, frozen dinners, canned entrees, and the like. In such an example, the order chronicle 112 may include the cause of the user's biological extraction 108 data, wherein if the order chronicle 112 could be changed over time to eliminate the offending alimentary elements, and results in the biological extraction 108 data indicated improved health. An alimentary profile 116 may be used to indicate which alimentary elements of a user's order chronicle 112 are beneficial to their overall health, and which are harmful to the user's overall health. An alimentary profile 116 may indicate instances wherein ordering history is dictated by biological extraction data and instances where ordering history effects, contributes to, or potentially explains elements of data in a biological extraction. Alimentary profile 116 may include mathematical relationships derived from an alimentary machine-learning model illustrating such data, as described in further detail below.

Continuing in reference to FIG. 1, computing device 104 is configured to identify, using the alimentary profile 116 and a predictive machine-learning process, a predicted alimentary element and an alternative alimentary element. A "predicted alimentary element," as used in this disclosure, is an alimentary element that a user is predicted to order according to the data contained in the user's alimentary profile 116, biological extraction 108, and order chronicle 112. A predicted alimentary element 124 may be the same item that a user has previously ordered. A predicted alimentary element 124 may be a predicted alimentary element that a user has not before ordered according to a user's order chronicle 112. For instance, a user may be in a new region, with originators that are foreign to the user, and system 100 may generate a predicted alimentary element 124 for a user, despite the user not being aware of the alimentary elements available to them. A "alternative alimentary element," as used in this disclosure is an alternative alimentary element that is an alimentary element predicted generated by a computing device 104 as an alternatively to a predicted alimentary element, wherein the alternative alimentary element is more beneficial to a user's biological extraction 108 data. For instance and without limitation, a predicted alimentary element 124 may be a buffalo chicken sandwich, wherein the chicken is breaded and the buffalo sauce contains lactose, and an alternative alimentary element 128 is a buffalo chicken sandwich with grilled chicken and buffalo sauce without lactose. In such an example, the alternative alimentary element 128 may be from the same originator as a predicted alimentary element 124, but with modifications. Alternatively or additionally, the alternative alimentary element 128 may be from a different originator as a predicted alimentary element 124.

Continuing in reference to FIG. 1, computing device 104 is configured for determining, using the predictive machine-learning process and the alimentary profile 116, the predicted alimentary element 124, wherein the predicted alimentary element 124 is a predictive alimentary element a user is expected to order. A predictive machine-learning process 132 may be generated by a computing device 104 performing a machine-learning algorithm and/or process by using a machine-learning module, as described in further detail below.

Continuing in reference to FIG. 1, generating the predicted alimentary element 124 may include identifying a temporally anterior alimentary element present in the user alimentary element order chronicle 112. Identifying a temporally anterior alimentary element may include searching, by computing device 104, a user's order chronicle 112 for discrete alimentary elements, such as individual alimentary elements that may be obtained from an originator. As used in this disclosure, an "temporally anterior alimentary element," is an alimentary element that has been consumed by user temporally anterior, or any point in time prior to initiating system 100, which may include an alimentary element as part of order chronicle 112, an alimentary element indicated by user input via graphical user interface, an alimentary element input via a second application for tracking alimentary elements, or the like. Computing device 104 may identify using individual alimentary elements indicated by a user as inputs via a graphical user interface, as described in further detail below. Identifying alimentary elements may include identifying a list of ingredients, prices, and nutrition facts of an alimentary element. For instance, if an order chronicle 112 indicates a Cobb salad from originator X, wherein the computing device may identify that a Cobb salad from originator X corresponds to an alimentary element that was $12.99, including chopped greens, tomato, bacon crisps, roasted chicken breast, hard-boiled eggs, avocado, chives, Roquefort cheese, and red-wine vinaigrette, with 730 calories, 30 grams protein, 53 grams fat, and 35 grams carbs.

Continuing in reference to FIG. 1, generating the predicted alimentary element 124 may include searching, using the alimentary profile 116 and the predictive machine-learning process 132, for a plurality of alimentary elements, wherein searching includes identifying alimentary element metrics present in the temporally anterior alimentary element, and locating the plurality of alimentary elements containing similar alimentary element metrics. As used in this disclosure, an "alimentary element metric" is an element of data that can be used to discriminate between alimentary elements, including price, ingredients, name, originator, nutrition facts, and the like. As used in this disclosure, "an alimentary element metric" may simply be referred to as "a metric." Computing device 104 may identify an alimentary element, including all alimentary element metrics, and search for a plurality of alimentary elements. Searching for a plurality of alimentary element may include locating alimentary elements with identical ingredients. Searching for a plurality of alimentary elements may include locating alimentary elements with similar ingredients. Searching for a plurality of alimentary elements may include locating alimentary elements from the same originator, or a different originator. Searching may be performed by computing device 104 using a web-browser, mobile application, restaurant menu, grocery store inventory, database, research repository, or any other suitable source of alimentary element information. In non-limiting illustrative examples, a search based on ingredients from a Cobb salad may return other salad types such as a grilled chicken salad, Caesar salad, and the like. In further non-limiting illustrative examples, a search may return alimentary elements that are not salads but share the ingredients, such as a bacon, chicken, avocado wrap with tomato, chopped greens, a dressing, and a cheese.

Continuing in reference to FIG. 1, generating the predicted alimentary element 124 may include generating at least an alimentary element metrics for each of the plurality of alimentary elements. Each identified alimentary element from the search according to alimentary element metrics, as described above, may have its alimentary element metrics retrieved. Computing device 104 may generate a file wherein each element of the file is a queried alimentary element associated with a list of alimentary element metrics. For instance, each queried alimentary element may have associated with it an originator location from where the alimentary element was identified, ingredients, price, alimentary element name, and nutrition facts. For instance, in non-limiting illustrative examples, a queried alimentary element may be a bacon-chicken-avocado wrap from originator Y, with a price of $12.00 and ingredient list of chicken, bacon, avocado, whole wheat tortilla wrap, tomato, chopped greens, a cheese, and a dressing, and nutrition facts of 820 calories, 49 grams fat, 57 gram carbohydrates, and 41 grams protein. All alimentary elements of the plurality of alimentary elements identified by the search performed by computing device 104 may contain this data in the file.

Continuing in reference to FIG. 1, generating the predicted alimentary element 124 may include calculating, using the alimentary element metrics, a first similarity metric between the temporally anterior alimentary element and each of the plurality of alimentary elements. A "first similarity metric," is a numerical value that measures a relationship between alimentary element metrics of a predicted alimentary element and any temporally anterior alimentary element that may have been identified from a user's order chronicle. A first similarity metric 136 may be calculated as a function of similarity to a predicted alimentary element 124. For instance and without limitation, first similarity metric 136 may be a numerical value that is a percent similarity between two ingredient sets, wherein out of 10 ingredients, an alimentary element contains 8 ingredients, it would have 80% similarity. In non-limiting illustrative examples, a first similarity metric 136 may be calculated from a comparison of price between a predicted alimentary element and an alimentary element in an order chronicle, wherein the metric is scaled on a factor of 1.0 where 1.0 equals an exact price match. In further examples, a metric of 1.2 would be a 20 percent increase in price, wherein a score of 0.5 would be half the price, with smaller metrics representing less costly alimentary elements, and the price would be bound at 0.0 for "free", such as an alimentary element from a party, event, or the like. Persons skilled in the art, upon review of this disclosure in its entirety, will be aware the various ways in which a first similarity metric 136 could be generated to compare alimentary metrics between any two pairing of alimentary elements, wherein one of the alimentary elements is the predicted alimentary element 124.

Continuing in reference to FIG. 1, generating the predicted alimentary element 124 may include ranking, using a ranking machine-learning process, the plurality of alimentary elements based on the first similarity metrics 136. Ranking machine-learning process may include any machine-learning algorithm and/or process performed by using a machine-learning module, as described in further detail below. Ranking machine-learning process 140 may accept an input that is a plurality of similarity metrics, including an associated plurality of alimentary elements, and generate an output that is a ranked list of the plurality of alimentary elements based on the similarity metrics. For instance and without limitation, ranking machine-learning process 140 may rank the similarity metrics in such a way that the highest ranking corresponds to alimentary elements that represent matches to outputs of a predicted alimentary element 124. A ranking machine-learning process 140 may rank using a formula, equation, function, or the like, that takes into account similarity metrics from comparing prices, ingredient lists, originator location, among other alimentary element metric categories.

Continuing in reference to FIG. 1, generating the predicted alimentary element 124 may include selecting the predicted alimentary element 124 based on the ranking of the plurality of alimentary elements. Ranking machine-learning process 140 may generate an output of ranked alimentary elements, wherein computing device 104 may select an alimentary element to be the predicted alimentary element 124 based on the ranking.

Continuing in reference to FIG. 1, computing device 104 is configured for generating, using the predicted alimentary element 124, the alternative alimentary element 128, wherein generating includes creating a classifier, using a classification machine-learning process, wherein the classifier contains alimentary element metrics of the predicted alimentary element. A "classifier" may be configured to output at least a datum that labels or otherwise identifies a set of data that are clustered together, as described in further detail below. A classifier may represent a body of data that is a series of alimentary element metrics describing a predicted alimentary element. In non-limiting illustrative examples, a classifier may relate to the price, ingredients, nutrition facts, and originator of a predicted alimentary element that may be a packet of data used to search or otherwise identify an alternative alimentary element.

Continuing in reference to FIG. 1, generating the alternative alimentary element may include generating a sustenance machine-learning model, wherein the sustenance machine-learning model is trained with training data that includes a plurality of entries wherein each entry relates user biological extraction to alimentary elements that have beneficial effects on user biological extraction parameters. Sustenance machine-learning model may be generated by a computing device 104 performing a machine-learning algorithm and/or process by using a machine-learning module, as described in further detail below. Training data for sustenance machine-learning model 144 may include data that is categorized using a classifier, as described above. Classifier may describe alimentary elements for a subset of users with alike biological extraction 108, order chronicle 112, and/or other data, metrics, and the like. Alternatively or additionally, sustenance machine-learning model 144 may be trained with training data that contains a single user's biological extraction 108 data and determines which alimentary elements may be beneficial to that user.

Continuing in reference to FIG. 1, as used in this disclosure, a "beneficial alimentary element," is any alimentary element that improves a user's biological extraction 108 parameters. Improvement of biological extraction 108 parameters may refer to driving a user's biological extraction parameters into a normal, or otherwise healthy range, for their age, sex, height, etc. For instance and without limitation, a user's consumption patterns may be carbohydrate heavy, leading to a state of prolonged increased blood sugar, wherein blood sugar levels have established thresholds for 'normal' and/or 'healthy' among individuals. In such an example, a beneficial alimentary element 148 may be an alimentary element that provides satiety similar to a first alimentary element that user would choose but has a reduced glycemic index. A beneficial alimentary element 148 may be any alimentary element that avoids a user's allergies, food intolerances, and/or any negative or unintended effect on a user's biological extraction, including effects a user was not initial aware. In non-limiting illustrative examples, sustenance machine-learning model 144 may be a model trained to output alimentary elements that may improve a user's biological extraction by training with data that reveals patterns, heuristics, or any other qualitative and/or quantitative relationships between the effect alimentary elements may have on biological extraction 108, and how this may effect a user's current biological extraction 108 or ordering behaviors. In some cases, an alimentary element that may be beneficial among users will be the same, or similar; however, an alternative alimentary element 128 based on a predicted alimentary element 124 using the relationships in the sustenance machine-learning model 144 may result in different results among users due to taking into account food preferences and individual differences in biological extraction 108.

Continuing in reference to FIG. 1, computing device 104 generating the alternative alimentary element may include searching, using the sustenance machine-learning model 144, for a plurality of beneficial alimentary elements 148. Computing device 104 may use the relationships captured in the sustenance machine-learning model 144 and the generated outputs of at least a beneficial alimentary element 148 to search for a plurality of beneficial alimentary elements 148. Computing device 104 may search any source, as described above. In non-limiting illustrative examples, computing device 104 may search using the predicted alimentary element 124 and/or any alimentary element metric of a predicted alimentary element 124. For instance and without limitation, a computing device 104 may search for beneficial alimentary elements 148 that are similar to a first beneficial alimentary element 148 output by the model with a criterion of having at least one ingredient in common with a predicted alimentary element 124. In further non-limiting illustrative examples, computing device 104 may search for a plurality of beneficial alimentary elements 148 using alimentary element metrics of a first beneficial alimentary element 148 output by a sustenance machine-learning model 144. Sustenance machine-learning model 144 may generate the plurality of beneficial alimentary elements 148 as an output from the training data used to train the model.

Continuing in reference to FIG. 1, computing device 104 generating the alternative alimentary element 128 may include may retrieving alimentary element metrics of the plurality of beneficial alimentary elements 148. Each identified beneficial alimentary element 148 from a search, as described above, may have its alimentary element metrics retrieved, as described above. Computing device 104 may generate a file wherein each element of the file is a queried beneficial alimentary element 148 associated with a list of alimentary element metrics. For instance, each queried alimentary element may have associated with it an originator location from where the alimentary element was identified, ingredients, price, alimentary element name, and nutrition facts, as described above.

Continuing in reference to FIG. 1, computing device 104 generating the alternative alimentary element 128 may include calculating a second similarity metric based on similarity of the alimentary element metrics of the plurality of beneficial alimentary elements and the predicted alimentary element. As used in this disclosure, "second similarity metric" is a numerical value that measures a relationship between alimentary element metrics of a predicted alimentary element 124 and any beneficial alimentary element 148. For instance and without limitation, second similarity metric 152 may be a numerical value that is a percent similarity between two ingredient sets, wherein out of 10 ingredients, a beneficial alimentary element 148 shares 4 ingredients with a predicted alimentary element 124, it would have 40% similarity. In non-limiting illustrative examples, a distinction between a first similarity metric 124 and a second similarity metric 152 may be that a first similarity metric 124 relates to similarity between alimentary elements identified in a user's order chronicle and the predicted alimentary element 124 output from system 100; a second similarity metric 152 relates to similarity between a predicted alimentary element 124 and a beneficial alimentary element 148 that may represent a candidate to replace it. Persons skilled in the art, upon review of this disclosure in its entirety, will be aware the various ways in which a second similarity metric 152 could be generated to compare alimentary metrics between any two pairing of alimentary elements, wherein one of the alimentary elements is a beneficial alimentary element 148.

Continuing in reference to FIG. 1, computing device 104 generating the alternative alimentary element 128 may include ranking, using the ranking machine-learning process 140, the plurality of beneficial alimentary elements 148 based on the second similarity metric 152. Ranking machine-learning process 140 may rank beneficial alimentary elements using the second similarity metrics 152 as was done with ranking the predicted alimentary elements using the first similarity metrics 136, as described above.

Continuing in reference to FIG. 1, computing device 104 generating the alternative alimentary element 128 may include selecting the alternative alimentary element 128 based on the ranking, wherein the alternative alimentary element 128 is selected from the plurality of beneficial alimentary elements 148. Computing device 104 may select the alternative alimentary element 128 as a function of the ranking as was done for selecting a predicted alimentary element 124 as a function of its ranking. In non-limiting illustrative examples, ranking machine-learning process 140 may generate an output that is a ranked list of beneficial alimentary elements 148, wherein a top-ranked output in the list is a beneficial alimentary element 148 that most benefits a user's biological extraction and/or is most similar to a predicted alimentary element 124 based on the plurality of factors in the alimentary metrics of each alimentary element. Computing device 104 may select a beneficial alimentary element 148 as a function of the ranking to represent an output that is the alternative alimentary element 128.

Continuing in reference to FIG. 1, computing device 104 generating the alternative alimentary element 128 is configured for ranking alimentary elements as a function of effect to a user's biological extraction if substituted for the predicted alimentary element 124. Ranking machine-learning process 140 may be used to rank beneficial alimentary elements 148 as a function of effect on a user's biological extraction 108. For instance and without limitation, ranking machine-learning process 140 may rank outputs of system 100, including predicted alimentary element 124, order chronicle 112 alimentary elements, beneficial alimentary elements 148, and alternative alimentary element 128, to provide user comprehensive effect on biological extraction 108 as a function of order behaviors. Ranking machine learning-process may rank alimentary elements based on effect on biological extraction using the relationships described in the sustenance machine-learning model 144 which is trained on how alimentary elements may affect biological extraction 108. In non-limiting illustrative examples, such a sustenance machine-learning model 144 may be trained with a classifier relating to types of alimentary elements, types of users, elements of biological extraction data 108 to locate and refine relationships, patterns, functions, models, and the like. Computing device 104 may select an alimentary element to be an alternative alimentary element 128 as a function of effect on a user's biological extraction 108.

Continuing in reference to FIG. 1, computing device 104 is configured to generate a representation via a graphical user interface of the predicted alimentary element 124 and the alternative alimentary element 128 to a user. A "graphical user interface," as used in this disclosure, is any form of a user interface that allows a user to interface with an electronic device through graphical icons, audio indicators, text-based interface, typed command labels, text navigation, hyperlinked elements, and the like, wherein the interface is configured to provide information to the user and accept input from the user. Computing device 104 may generate a representation of the predicted alimentary element 124 via a graphical user interface using any mapping application or algorithm, for instance and without limitation, a web-based navigation application such, a mobile navigation application, or the like. Computing device 104 may use any mapping application in combination with a user's geophysical location to determine nearby originators which may provide a predicted alimentary element 124. A "geophysical location," as used in this disclosure, is an address, longitude and/or latitude position, global position system (GPS) coordinates, or the like, that system 100 may use to identify originators nearby a user and retrieve alimentary element data. As used herein, geophysical location may be simply referred to as "geophysical data," which means geophysical data concerning at least a location. Computing device 104 may similarly generate a representation of the predicted alimentary element 124 via a graphical user interface using any mapping application or algorithm, for instance and without limitation, a web-based navigation application such, a mobile navigation application, or the like. Persons skilled in the art, upon review of this disclosure in its entirety, will be aware of the various ways in which a computing device 104 may display to a user a physical transfer path via a graphical user interface, and be aware the various navigation applications that may be used to communicate a physical transfer path.

Continuing in reference to FIG. 1, providing the representation of the predicted alimentary element 124 and the alternative alimentary element 128 may include queuing the predicted alimentary element 124 and the alternative alimentary element 128 with an alimentary element originator, wherein queuing includes locating a first alimentary element originator with at least a metric that matches the predicted alimentary element 124 or the alternative alimentary element 128 within a first distance of a user. Computing device 104 may search within a first radius of a user for alimentary element originators including associated data, for instance and without limitation hours of operation, geophysical location, etc. Computing device 104 may locate an alimentary element originator and retrieve an alimentary element repository, such as a menu, item list, etc. In non-limiting illustrative examples, computing device 104 may restrict search locally, for instance if a user is in a grocery store, computing device 104 may search the grocery store for alimentary elements that are a predicted alimentary element 124 and/or an alternative alimentary element 128. In such an example, a user may indicate via the graphical user interface to computing device 104 to locate the ingredients for predicted alimentary element 124 that may include obtaining and purchasing a plurality of ingredients to prepare predicted alimentary element 124. In this case, computing device 104 may function as a shopping list for replicating the predicted alimentary element 124 and/or an alternative alimentary element 128. In further non-limiting illustrative examples, user may be prompted to select, or otherwise indicate, a particular predicted and/or alternative alimentary element and computing device 104 may determine if the ingredients are present at the current grocery store, cycling through options until one is identified. In such an example, computing device may present the ingredient list to the user for shopping purposes, adding to the order chronicle 112.

Continuing in reference to FIG. 1, computing device 104 may queue a predicted alimentary element 124 or an alternative alimentary element 128. A "queue," as used in this disclosure, is a collection of alimentary elements that are maintained in a sequence and can be modified by the addition of entities and removal of entities from the sequence via an interactive interface with a user. In non-limiting illustrative examples, the queue may have an "active end" and a "reserve end," wherein the active end is the predicted alimentary element 124 and/or alternative alimentary element 128 that has been located by the computing device 104 in a nearby alimentary element originator; additionally, there may be related alimentary elements that are in the queue "behind" the predicted alimentary element 124 and alternative alimentary element 128 nearer the reserve end. In further non-limiting illustrative examples, a user may indicate via the graphical user interface that they do not want a predicted alimentary element 124, whereby computing device 104 may remove it from the active end and push up by one place the other alimentary elements in the queue. In such an example, computing device 104 may add a newly generated alimentary element to the reserve end to maintain a list that a user may view, scroll through, or the like. Computing device 104 may locate an alimentary element originator for each alimentary element in the queue; alternatively or additionally, computing device 104 may restrict searches to the most 'active end' entity in the queue or to an alimentary element that a user as selected.

Continuing in reference to FIG. 1, providing the representation of the predicted alimentary element and the alternative alimentary element may include addressing a user to order an alimentary element of the predicted alimentary element 124 and the alternative alimentary element 128. Computing device 104 may prompt a user, via the graphical user interface, to order the predicted alimentary element 124 or the alternative alimentary element 128. Computing device 104 may queue alimentary elements, as described above, and user may have the option to indicate a selection of an alimentary element. In non-limiting illustrative examples, user may be prompt to indicate selection of the predicted alimentary element 124, but rather selects that they do not want the predicted alimentary element 124 and prefers a healthier option, wherein the queue moves up the second option, providing an alternative alimentary element 128, again prompting the user.

Continuing in reference to FIG. 1, providing the representation of the predicted alimentary element 124 and the alternative alimentary element 128 may include prompting a user to order from a plurality of substitute alimentary options. A "substitute alimentary options," as used in this disclosure, are alternative alimentary elements 128 generated by computing device 104 according to a user input. Computing device 104 may provide substitute alimentary options depending on a particular alimentary metric associated with a predicted alimentary element 124 and/or alternative alimentary element 128. For instance and without limitation, a user may want alimentary elements that are 'plant-based only' and communicate via textual-based interface for computing device 104 to generate alternative alimentary elements 128 that a user may enjoy according to order chronicle and biological extraction. In non-limiting illustrative examples, a user may indicate that they want a vegan option version of a non-vegan meal identified in their order chronicle 112; computing device 104 may provide a plurality of substitute alimentary options based on the user-indicated stipulation of vegan options.

Continuing in reference to FIG. 1, providing the representation of the predicted alimentary element 124 and the alternative alimentary element 128 may include generating an audiovisual notification for addressing a user to select from a plurality of alternative alimentary elements. An "audiovisual notification," as used in this disclosure, is a piece of information that alerts a subject to ordering an alimentary element. An audiovisual notification may be a textual alert, a graphic, a vibration alert, a sound, or any other audiovisual notification, or combination thereof, that computing device 104 may provide a user. Audiovisual notification may include addressing the user to select an alimentary element, for instance from the plurality of alternative alimentary elements 128. Persons skilled in the art, upon review of this disclosure in its entirety, will be aware of the various ways in which a system 100 may provide an audiovisual notification to a user for ordering.

Continuing in reference to FIG. 1, addressing a user to order from a plurality of alternative alimentary elements 128 may include using a radial search machine-learning process, wherein the radial search machine-learning process determines a first distance, and searches the first distance for an alternative alimentary element originator, wherein the user can order at least an alternative alimentary element 128 from the alternative alimentary element originator. Ordering from the plurality of substitute alimentary options may include using a radial search machine-learning process, wherein the radial search machine-learning process determines a first radius, and searches the first radius for an alternative alimentary element originator, wherein the user can order at least a substitute alimentary element option from the alternative alimentary element originator. A radial search machine-learning process may include machine-learning algorithms, processes, and/or model, performed by a machine-learning module, as described in further detail below. Radial search machine-learning process 156 may execute a radial search, wherein the radial search machine-learning process 156 may find approximate solutions to combinatorial problems. Combinatorial problems involve finding a grouping, ordering, clustering, or assignment of a discrete, finite set of objects that satisfies given conditions.

Continuing in reference to FIG. 1, radial search machine-learning process 156 may accept an input of a user geophysical location and an alimentary element identity and search within a first radius for an alimentary element originator, search the originator for an alimentary element that satisfies a substitute alimentary element, generating an output that describes the alimentary element, geophysical location, and originator identity. Alternatively or additionally, radial search machine-learning process may begin with a first alimentary element originator geophysical location and menu, ingredient list, etc. as a "local solution" and select the first alimentary element originator geophysical location as the center for the first radial search. Radial search machine-learning process may be used to determine an originator for any alimentary element described herein, including for instance and without limitation, a predicted alimentary element 124 and/or alternative alimentary element 128, as described above. Radial search machine-learning process 156 may place the input data on a 2-Dimensional grid, for instance and without limitation, using a mapping application or algorithm, for instance and without limitation, a web-based navigation application such, a mobile navigation application, or the like, that may relate geophysical location in a predetermined area base on a first location using a computing device 104 and/or user device. Radial search machine-learning process 156 may use such an accessible mapping tool, application, and/or algorithm for radial search.

Continuing in reference to FIG. 1, radial search machine-learning process 156 may employ a radial search approach using the concept of rings, wherein each ring is a particular distance about a location, which defines the location and size of search areas, perhaps about a current 'good' solution. For instance, a predicted alimentary element 124 and first alimentary element originator may be a current 'good' solution, but a radial search may indicate a larger ring about an originator for the predicted alimentary element 124, searching further from that location. Radial search iteratively modifies the radii of these rings, and generates new centers, to cover the search space. A concentration step corresponds to choosing a solution as the center of a new ring. An expansion step corresponds to the exploration around a given center by increasing and reducing the radius of the ring until a better solution other than the current center is found. A "better solution" may include an alimentary element originator that is nearer to a user, contains a predicted alimentary element 124, contains an alternative alimentary element 128, among other criteria. This dynamic process of centration and expansion of the search is repeated until a stopping condition is met. A stopping condition, for instance and without limitation, may be an originator that supplies an alimentary element a user has indicated is suitable, or otherwise a match to an alimentary element in the queue, and/or an alimentary element that is a minimal distance from user current geophysical location.

Continuing in reference to FIG. 1, radial search machine-learning process 156 may use any form of proximity search or any algorithm used for solving an optimization problem of locating the point (originator) in a given set that is closet to a given point (user). Radial search algorithms, methods, and computational processes that radial search machine-learning process 156 may use, as described herein, may include exact methods of proximity search including linear search and space partitioning; approximation methods such as Greedy search in proximity neighborhood graphs, locality sensing hashing, nearest neighbors search in spaces with small intrinsic dimension, projected radial search, vector approximation filing, and compression/clustering based search. Alternatively or additionally, radial search machine-learning process 156 may include variants of radial search methods and algorithms such as k-nearest neighbors, approximate nearest neighbors, fixed-radius near neighbors, and all nearest neighbors.

Continuing in reference to FIG. 1, providing the representation of the predicted alimentary element and the alternative alimentary element may include generating, using the predictive machine-learning process 132, a user-indicated alimentary element log, wherein the predictive machine-learning process includes selections of alimentary elements in the user-indicated alimentary element log in real-time. As used in this disclosure, a "user-indicated alimentary element log" is a cache, log, file, or the like, configured for saving at least a user-selected alimentary element to a database for use by system 100. As used in this disclosure, "real-time" refers to instantaneous determination by computing device 104 as soon as data and/or input is generated as a function of user interaction. As used herein, a database may refer to any information repository suitable to storing and/or retrieving a cache of past user-selected options and/or graphical user interface inputs, including any and all associated data, for use by system 100. In non-limiting illustrative examples, a database may include a NOSQL database which employs a mechanism for storage and/or retrieval of geophysical data, order chronicle 112, patterns of ordering, patterns of user movement, alimentary elements provided to user and selected by user, user search inputs, and the like, as described in further detail below.

Continuing in reference to FIG. 1, generating, using the predictive machine-learning process 132, the user-indicated alimentary element log may include building a user-indicated alimentary element catalogue. A "user-selected alimentary element catalogue," as used herein is an order chronicle 112 that has been created through use of system 100, wherein originator geophysical data, etc. are associated with the alimentary elements the user has selected and/or has removed from a queue since initializing system 100. In non-limiting illustrative examples, a user-indicated alimentary element catalogue 160 may include a plurality of predicted alimentary elements 124 a user has selected and/or indicated not to have ordered despite being provided, including originators, and geophysical locations of radial searches and solutions that have worked.

Continuing in reference to FIG. 1, logging user-selected option may include generating, using the alimentary machine-learning model 120, at least a predicted biological extraction datum of the user as a function of the user-indicated alimentary element catalogue. updating, using the alimentary machine-learning model 120, the biological extraction 108 of the user as a function of the user-indicated alimentary element catalogue 160. Alimentary machine-learning model 120 may be trained, as described above, for relationships between order chronicle 112 and biological extraction, and system 100 may include all user-selected options cached from system 100 to iteratively generate predicted biological extraction 164. "Predicted biological extraction," as used in this disclosure, is an element of biological extraction data relating to a user that is output by system 100 according to selected alimentary elements without being directly observed. Predicted biological extraction 164 is an element of data that is predicted by a machine-learning model trained with data that relates user-indicated alimentary elements to the user's current biological extraction. Predicted biological extraction 164 may be stored and/or retrieved using a database. Predicted biological extraction 164 may be provided to a user via a graphical user interface. Predicted biological extraction 164 may include predicted effects and/or parameters pertaining to a user according to any changes in ordering behaviors and/or patterns. In non-limiting illustrative examples, predicted biological extraction 164 may include calculated differences in nutrition, including calories, macronutrients, potential nutritional deficiencies, and the like, wherein a user has been ordering alimentary elements with fewer calories fewer alimentary element orders per day. In further non-limiting illustrative examples, predicted biological extraction 164 may include information regarding sodium intake as it relates to user blood pressure, wherein a graphical user interface provides sodium intake versus daily recommended intake and blood pressure as a function of time.

Figure 2:
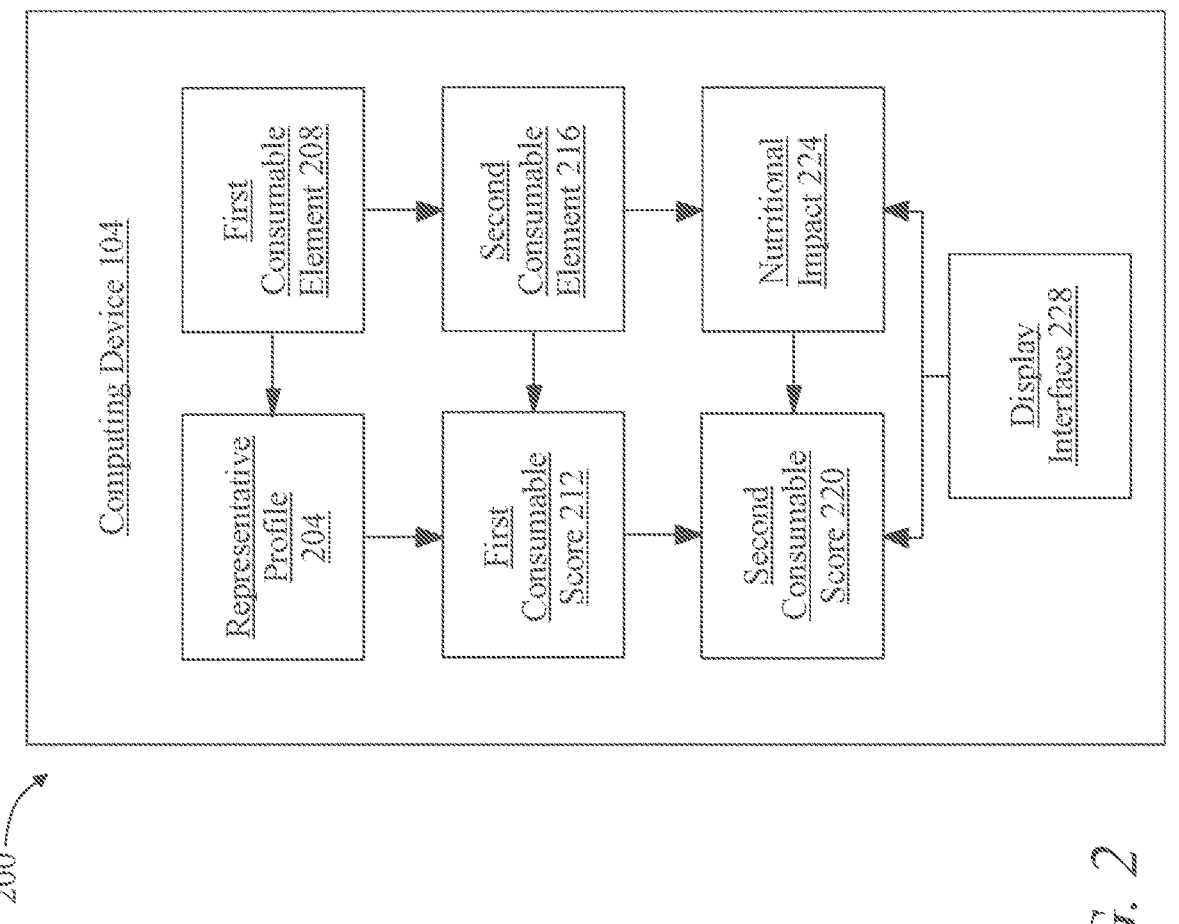
FIG. 2 is a block diagram illustrating an exemplary embodiment of a system for arranging consumable elements within a display interface.

Now referring to FIG. 2, a system 200 for arranging consumable elements within a display interface is illustrated. System 200 includes a computing device 104. Computing device 104 includes any of the computing device 104 as described above, in reference to FIG. 1. In an embodiment, and without limitation, computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 2, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, computing device 104 may be configured to receive a representative profile 204. A "representative profile," as used in this disclosure, is a conglomerate of one or more human profiles. A human profile identifies one or more groups and/or classes of human beings based on one or more demographic factors, including but not limited to race, ethnic origin, physical body measurements, disease type, geographical location, season in geographical location, biological extraction, component of a biological extraction, physical situation such as perimenopause, childbirth, menopause, low testosterone, andropause, genetic condition and the like. A group of human beings may be identified based on a demographic factor that groups human beings based on what stage of life they are currently in. A stage of life may be based on stages of a human life cycle such as infancy, toddler years, childhood, puberty, older adolescence, adulthood, middle age, senior years, and the like. A group of human beings may be identified based on a demographic factor that groups human beings based on gender, including male or female. A group of human beings may be identified based on a demographic factor that groups human beings based on pre-determined income levels. A group of human beings may be identified based on a demographic factor that groups human beings based on highest educational level achieved. A group of human beings may be identified based on one or more demographic factors, such as chronological age and gender, or stage of life and gender. Information pertaining to representative profile 204, and human profiles may be stored within input database, wherein an input database is described above. Representative profile 204 may include a demographic label. A "demographic label," as used in this disclosure, is an identifier of one or more demographic factors used to create a human profile. For instance and without limitation, a demographic label may identify a demographic factor such as age, that is used to create a human profile, consisting of humans within the age range of between 35 and 40 years old. In yet another non-limiting example, a demographic label may identify two demographic factors used to create a human profile, consisting of humans who make an annual, may be selected using a classifier, wherein a classifier is described above. Representative profile 204 may include any representative profile implemented, without limitation, as described in U.S. Nonprovisional application Ser. No. 16/919,532, filed on Jul. 2, 2020, and entitled "METHODS AND SYSTEMS FOR CALCULATING NUTRITIONAL REQUIREMENTS IN A DISPLAY INTERFACE," the entirety of which is incorporated herein by reference.

Still referring to FIG. 2, computing device 104 may be configured to identify an alimentary profile 116. Alimentary profile 116 may include any alimentary profile 116 as described above in reference to FIG. 1. For example, and without limitation, alimentary profile may include a profile that indicates a user has a plurality of allergies and/or intolerances. As a further non-limiting example, alimentary profile 116 may include a profile denoting one or more relationships that indicate a user habit user history, alimentary element patterns, and the like there of. In an embodiment, and without limitation, identifying alimentary profile 116 may include determining a user ordering behavior. As used in this disclosure a "user ordering behavior" is a behavior and/or routine that a user exhibits when ordering an edible and/or aliment. For example, and without limitation, user ordering behavior may denote that a user routinely and/or habitually orders pizza every Friday. As a further non-limiting example, user ordering behavior may denote that a user routinely and/or habitually avoids dairy products. Computing device 104 may identify alimentary profile 116 as a function of user ordering behavior. For example, computing device 104 may identify an alimentary profile of a vegan as a function of a user ordering behavior denoting a user routinely avoids meat and/or dairy products.

Still referring to FIG. 2, computing device 104 is configured to receive a first consumable element 208. As used in this disclosure a "consumable element" is an element of data identifying a proposed consumable item, including any meal, supplement, beverage, snack, vitamin, herbal remedy, consumable, and the like thereof and/or portion of a meal, supplement, consumable and the like thereof. In an embodiment, and without limitation, first consumable element 208 may include data describing any breakfast, lunch, dinner, snack, and/or beverage item. In another embodiment, and without limitation, first consumable element 208 may include an identification of any supplement and/or consumable such as vitamins, minerals, nutraceuticals, homeopathic consumables, and the like thereof. Additionally or alternatively, consumable element 208 may be stored within an input database. For example, input database may include information listing one or more consumable elements that are available for breakfast, such as a first consumable element identifying buckwheat pancakes with maple syrup, a second consumable element identifying a vitamin C tablet, and a third consumable element identifying scrambled eggs with toast and bacon. Computing device 104 may receive a first consumable element 208 from a list containing a plurality of consumable elements pertaining to alimentary items within a specified geographical area. First consumable element 208 stored within input database may be organized into one or more lists based on consumable elements 208 that are available within a geographical area. A geographical area may include a global position system (GPS) of a location, including for example, a GPS location of a remote device. A geographical area may include a description of the latitude and longitude of a position where a remote device is currently located and/or may be located in the future. A geographical area may be identified using one or more inputs received from a remote device. For example, computing device 104 may receive a textual input from a remote device that specifies a user is located in San Francisco, California. In such an instance, computing device 104 may receive a consumable elements 208 pertaining to fare available in San Francisco, from a list indicating which consumable elements 208 identify comestibles that are currently available within San Francisco. Information relating to consumable elements 208 that identify alimentary items available within a geographical area may be contained within one or more lists stored within input database 120. Consumable element 208 may include includes a portion size, indicating what size and/or quantities of a consumable element is available. For example, a portion size may indicate that an alimentary item containing beef is available in small, medium, large, and extra-large portions.

Still referring to FIG. 2, computing device 104 is configured to calculate a first consumable score 212 as a function of the first consumable element 208. As used in this disclosure a "consumable score" is data, including any character, symbolic, and/or numerical data, reflecting the current overall physiological effect of a consumable element for an individual. Consumable score 212 may be transient and/or dynamic and varies based on ingredients utilized, recipe, cooking instructions, storage impacts, meal size, supplement potency, supplement configuration, drink size, snack size, and the like. Consumable score 212 may be graded on a continuum, where a score of zero may indicate a consumable element has an extremely poor physiological effect for a human profile, while a score of 100 may indicate a consumable element has an excellent physiological effect for a human profile. A negative physiological effect may reflect a consumable element that has no beneficial effect for alimentary profile 116 and may have a net detrimental effect. In such an instance, a negative consumable score may or may not contain a numerical assignment. In an embodiment, a consumable score 212 may be given a range of scores, where a consumable score 212 may be reported as falling between a range of 41-82.

With continued reference to FIG. 2, computing device 104 may receive at an image capture device located within computing device 104 a photograph of a first consumable element 208. An "image capture device" as used in this disclosure, includes any device suitable to take a picture or photograph of a first consumable element 208. Image capture device may include for example a camera, mobile phone camera, scanner or the like. In an embodiment, a photograph of a first consumable element 208 may be received from a remote device operated by a user. For example, a user may take a photograph of a first consumable element 208 using a camera located on a remote device containing an image capture device that contains a photograph of a UCC barcode or a photograph that contains a picture of a particular food such as a picture of an eggplant or a picture of a boxed pasta. A first consumable element 208 includes any substance intended for consumption by a human being. A first consumable element 208 may include a substance containing a single ingredient such as an avocado or lamb meat. A first consumable element 208 may include a substance containing two or more ingredients such as a *quinoa* salad containing chickpeas, red onion, red pepper, and shrimp. A first consumable element may include a pre-packaged substance such as RITZ CRACKERS as produced by Nabisco of East Hanover, New Jersey or PUFFED MILLET CEREAL as produced by Arrowhead Mills of Hereford, Texas. A first consumable element may include a generic brand that may not contain a brand name such as a particular grocery store or food store brand label or private label. A first consumable element 208 may include a brand name product such as 365 EVERYDAY VALUE PRODUCTS as produced by Whole Foods Market of Austin. A first consumable element 208 may include any substance available for physical and/or digital sale. Physical sale may include but is not limited to a grocery store, food store, supermarket, bazaar, bodega, co-op, corner store, delicatessen, general store, trading post, warehouse, food hall, market, kitchen, retail store, outpost and the like. Digital sale may include but is not limited to any food element sold through a digital media such as a website, blog, social media platform, digital magazine, digital property and the like. Digital may include but is not limited to an individual food element such as an avocado available for purchase on a website. Digital may include but is not limited to a combination of one or more food elements available for purchase such as a meal containing multiple food elements such as chicken alfredo with broccoli. Image capture device may also capture an image of an identifier of a first consumable element 208, such as for example a globally recognized uniform identifier such as a uniform code commission (UCC) barcode. Upon receiving a photograph of a first consumable element 208, computing device 104 may calculate a first consumable score 212 as a function of the first consumable element 208. This may be performed utilizing any methodology as described herein.

With continued reference to FIG. 2, computing device 104 is configured to receive a second consumable element 216. A "second consumable element" as used in this disclosure, is any item suitable for use as first consumable element 208 as described above in more detail. In an embodiment, a first consumable element 208 may contain one or more different ingredients from a second consumable element 216. In an embodiment, a first consumable element 208 may be identical to a second consumable element 216 whereby the serving size of a first consumable element 208 may be different from the serving size of a second consumable element 216. Computing device 104 is configured to calculate a second consumable score 220 as a function of the second consumable element 216. This may be performed utilizing any methodology as described above in more detail in reference to FIGS. 1-2.

With continued reference to FIG. 2, computing device 104 is configured to identify a nutritional impact 224 as a function of consumable element 208. As used in this disclosure a "nutritional impact" is a proposed and/or predicted nutritional effect a consumable has based on the consumable composition. For example, and without limitation, nutritional impact 224 may be a value of 24 for raising blood glucose level as a function of a consumable comprising 4 g of carbohydrates. As a further non-limiting example, nutritional impact 224 may be a value of 80 for raising vitamin E plasma concentration as a function of a consumable comprising 8 g of vitamin E. Computing device 104 is configured to calculate consumable score 212 as a function of nutritional impact 224 and alimentary profile 116. In an embodiment, and without limitation, computing device 104 may calculate consumable score 212 as a function of a consumable machine-learning model. As used in this disclosure "consumable machine-learning model" is a machine-learning model to produce a consumable score output given nutritional impact and/or alimentary profiles as inputs; this is in contrast to a non-machine learning software program where the commands to be executed are determined in advance by a user and written in a programming language. Consumable machine-learning model may include one or more consumable machine-learning processes such as supervised, unsupervised, or reinforcement machine-learning processes that computing device 104 and/or a remote device may or may not use in the determination of consumable score 212. As used in this disclosure "remote device" is an external device to computing device 104. Consumable machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 2, computing device 104 may train consumable machine-learning process as a function of a consumable training set. As used in this disclosure a "consumable training set" is a training set that correlates a nutritional impact and/or alimentary profile to a consumable score. For example, and without limitation, a nutritional impact of raising serotonin levels and an alimentary profile of a chronic depression as a function of eating predominantly fried food may relate to a consumable score of 80 for reducing depressive symptoms. The consumable training set may be received as a function of user-entered valuations of nutritional impact, alimentary profiles, and/or consumable scores. Computing device 104 may receive consumable training set by receiving correlations of nutritional impact, and/or alimentary profiles that were previously received and/or determined during a previous iteration of determining consumable scores. The consumable training set may be received by one or more remote devices that at least correlate a nutritional impact and/or alimentary profile to a consumable score. The consumable training set may be received in the form of one or more user-entered correlations of a nutritional impact and/or alimentary profile to a consumable score.

Still referring to FIG. 2, computing device 104 may receive consumable machine-learning model from a remote device that utilizes one or more consumable machine-learning processes, wherein a remote device is described above in detail. For example, and without limitation, a remote device may include a computing device, external device, processor, and the like thereof. Remote device may perform the consumable machine-learning process using the consumable training set to generate consumable score 212 and transmit the output to computing device 104. Remote device may transmit a signal, bit, datum, or parameter to computing device 104 that at least relates to consumable score 212. Additionally or alternatively, the remote device may provide an updated machine-learning model. For example, and without limitation, an updated machine-learning model may be comprised of a firmware update, a software update, a consumable machine-learning process correction, and the like thereof. As a non-limiting example a software update may incorporate a new nutritional impact that relates to a modified alimentary profile. Additionally or alternatively, the updated machine learning model may be transmitted to the remote device, wherein the remote device may replace the consumable machine-learning model with the updated machine-learning model and determine the consumable score as a function of the nutritional impact using the updated machine-learning model. The updated machine-learning model may be transmitted by the remote device and received by computing device 104 as a software update, firmware update, or corrected consumable machine-learning model. For example, and without limitation consumable machine-learning model may utilize a random forest machine-learning process, wherein the updated machine-learning model may incorporate a gradient boosting machine-learning process.

Still referring to FIG. 2, computing device 104 may determine consumable score 212 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In an embodiment, and without limitation, classifier may classify a consumable and/or edible to a set of consumables and/or edibles that have previously identified consumable scores, wherein the classifier may determine a consumable score for the consumable and/or edible as a function of the set of consumables and/or edibles. In another embodiment, and without limitation, classifier may classify a consumable and/or edible to a consumable group, wherein the consumable group may be used to determine a consumable score as a function of the consumable group. For example, a consumable of a steak may be classified to a consumable group of protein, wherein the consumable group may have a score of 18.

Still referring to FIG. 2, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts.

Naïve Bayes classification algorithm may include a Bernoulli model that may be utilized when vectors are binary.

With continued reference to FIG. 2, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 2, computing device 104 may be configured to calculate consumable score 212 as a function of retrieving an input associated to consumable element 208. An "input," as used in this disclosure, is any entry including without limitation articles, journals, scientific observations, scientific discoveries, medical observations, expert knowledge, books, articles, blog posts, medical guidelines, scientific guidelines, observational studies, randomized control studies, quantitative research, qualitative research, descriptive research, explanatory research, best practices, evidence-based research, and the like. Input may be obtained from one or more experts, including any person who has a comprehensive and authoritative knowledge or skill in a particular area. Input may include an input credential, which identifies any qualification, achievement, quality, experience, and/or authority that indicates the author of an input is qualified to create a submission. In an embodiment, and without limitation, input credential may be determined as a function of an expert credential list. An "input credential status," as used in this disclosure, is an indication as to the validity and/or veracity of an input credential. An input credential status may reflect if an expert's credentials are currently active, retired, have been revoked, suspended, subject to disciplinary action, subject to a violation, expired, overturned as best practices or best evidence, invalidated, and the like. An input credential status may be stored and maintained within an expert credential list. An input credential status includes a temporal element. A "temporal element," as used in this disclosure, is a timestamp and/or any calendar information, indicating the last time an input credential status was updated. For instance and without limitation, a temporal attribute may indicate that an input credential status indicating an expert's credentials are still active, was last validated three days previously. An "expert credential list," as used in this disclosure, is a compilation of a current input credential status of one or more experts. An expert credential list may be stored within an input database and updated using any network methodology as described herein. Input database may be implemented without limitation, as a relational database, a key-value retrieval datastore such as a NOSQL database, or any other format or structure for use as a datastore that a person skilled in the art would recognize as suitable upon review of the entirety of this disclosure. Computing device 104 may discard an input as a function of an input credential status. Discarding may include not using an input and marking the input as inactive. Computing device 104 may discard inputs where expert credential list indicates that an input credential status is currently not active, such as if an expert's credentials have been retired, revoked, subject to disciplinary action, subject to a violation, overturned, and the like. Computing device 104 may select a subsequent input including a subsequent input credential. Computing device 104 may select a subsequent input from input database. Additionally or alternatively, input may be received from a remote device. A "remote device," as used in this disclosure, is a computing device, including but not limited to a mobile device such as a smartphone, tablet, laptop, desktop, and the like. An input may be received by computing device 104 using any network methodology as described herein.

Still referring to FIG. 2, computing device 104 may be configured to calculate consumable score 212 as a function of receiving a previous consumable score as a function of a score database. As used in this disclosure a "previous consumable score" is a consumable score that was previously calculated for a previous consumable element 208. Score database may be implemented without limitation, as a relational database, a key-value retrieval datastore such as a NOSQL database, or any other format or structure for use as a datastore that a person skilled in the art would recognize as suitable upon review of the entirety of this disclosure. For example, and without limitation, score database may store a plurality of previously calculated consumable scores associated to a plurality of previously received consumable elements 208. In an embodiment, and without limitation, receiving the previous consumable score may include identifying a consumable interval. As used in this disclosure a "consumable interval" is a specified interval indicating how frequently a user consumed a particular consumable element 208. For example, and without limitation, consumable interval may denote that a consumable element 208 was consumed three times in the past two weeks. A consumable interval may also indicate how recently a consumable score 212 has been recalculated and updated to account for any previously consumed consumable elements 208. For example, a consumable score 212 may indicate that the consumable score 212 was recalculated as a function of a time interval such as but not limited to seconds, minutes, hours, days, weeks, months, and the like thereof.

Still referring to FIG. 2, computing device 104 may determine a consumable effective element. As used in this disclosure a "consumable effective element" is a concentration of a consumable to produce a biological effect and/or impact. For example, and without limitation, consumable effective element may include one or more dose response assessments, dose-response relationships, effective does concentrations, and the like thereof. In an embodiment, and without limitation, consumable effective element may denote that vitamin K requires a dose concentration of 10 mg/mL to elicit a biological response of potassium channels opening. In an embodiment, and without limitation, determining consumable effective element may include identifying a predictive temporal element. As used in this disclosure a "predictive temporal element" is a predicted amount of time to elicit a biological response as a function of the concentration, wherein an amount of time includes a period of time such as seconds, minutes, hours, days, weeks, months, years, and the like thereof. In an embodiment, and without limitation, predictive temporal element may include a short-term predictive element. As used in this disclosure a "short-term predictive element" is a predictive element that represents one or more short-term biological effects and/or impacts. For example, short-term predictive element may represent one or more immediate biological effects such as effects that are elicited within a limited time frame after being dosed and/or consuming the consumable element. As a non-limiting example, short-term predictive element may include a time frame of 0-24 hours after immediately consuming consumable element 208. In another embodiment, and without limitation, predictive temporal element may include a long-term predictive element. As used in this disclosure a "long-term predictive element" is a predictive element that represents one or more long-term biological effects and/or impacts. For example, long-term predictive element may represent one or more prolonged biological effects such as effects that are elicited after a limited time frame after being dosed and/or consuming the consumable element. As a non-limiting example, long-term predictive element may include a time frame of 1 month, 1 year, 10 years, and the like thereof after consuming consumable element 208. Computing device 104 may calculate consumable effective element as a function of predictive temporal element, wherein calculating includes any of the calculating as described above.

Still referring to FIG. 2, computing device 104 may be configured to calculate a first consumable score as a function of a first consumable element. For example, and without limitation, a first consumable score of 80 may be calculated as a function of a first consumable element of an apple. Computing device 104 may be configured to calculate a second consumable score as a function of a second consumable element. For example, and without limitation, second consumable score of 40 may be calculated as a function of a second consumable element of a slide of pizza. Computing device 104 may arrange the first consumable score and the second consumable score as a function of a ranking process. A "ranking process," as used in this disclosure, is a process which orders one or more consumable elements 208 using one or more consumable scores 212. A ranking process may include generating a machine-learning process, including for example, a ranking algorithm. A ranking algorithm may be any algorithm, as described above, for classification, wherein classification may be performed as a ranking of inputs to generate outputs classified into a ranked list, provided a criterion for ranking. In non-limiting illustrative examples, the ranking may be a limitation logistic regression and/or naïve Bayes ranking algorithm, nearest neighbor algorithm such as k-nearest neighbors, support vector machines, least squares support vector machines, fisher's linear discriminant, quadratic classifiers, decision trees, boosted trees, random forest classifiers, learning vector quantization, and/or neural network-based algorithms, as described above. In non-limiting illustrative examples, arranging the first consumable score and the second consumable score may be implemented as a function of a ranking machine-learning process, wherein a ranking machine-learning process includes any of the machine-learning process as described above. In an embodiment, and without limitation, arranging the first consumable score and the second consumable score may further comprise ranking the first consumable score and the second consumable score as a function of the nutritional impact. For example, and without limitation, computing device 104 may rank a first consumable score and a second consumable score as a function of a first nutritional impact of elevating c-reactive protein concentrations and a second nutritional impact of elevating reactive oxygen species.

Still referring to FIG. 2, computing device 104 is configured to arrange a first consumable element 208 and a second consumable element 216 within a display interface 228 as a function of the ranking process. Displaying includes any of the displaying as described above, in reference to FIG. 1. As used in this disclosure a "display interface" is a form or other graphical element having data entry fields, where a user may select one or more fields to enter one or more elements relating to a consumable element 208, a consumable score 212 and the like. A graphical user interface may include one or more interfaces presented on a display screen of computing device 104 and/or remote device such as a laptop, tablet, mobile phone, television, and the like thereof.

With continued reference to FIG. 2, computing device 104 may be configured to select a representative profile 204 as a function of a user trait. A "user trait," as used in this disclosure, is any demographic information pertaining to a user. Demographic information may include but is not limited to a user's age, race, ethnicity, gender, marital status, income, education, employment, nationality, religion, and the like. A representative profile 204, includes any representative profile 204 as described above in more detail. Computing device 104 may compare a first consumable score 208 and a second consumable score 220 to a representative profile 204. Computing device 104 may then rank a first consumable score 208 and a second consumable score 220 as a function of and utilizing a representative profile 204. For instance and without limitation, a representative profile 204 may contain information pertaining to specific optimal ranges for a consumable score 208 based on a representative profile 204. In such an instance, a consumable score 208 that hews closer to the specific optimal ranges for a given representative profile 204 may be ranked higher than a consumable score 208 that hews farther from the specific optimal ranges. For example, a representative profile 204 may indicate that an optimal range for a consumable score 208 is between 65-85. In such an instance, a first consumable score 208 that lies between 52-75 may be ranked higher and displayed to a user first than a second consumable score 220 that lies between 42-60. Arranging a first consumable element 208 and a second consumable element 216 may include ranking the first consumable element 208 and the second consumable element 216 as a function of a serving size. A "serving size," as used in this disclosure, is a portion size of a consumable element 208. In an embodiment, a consumable element 208 may be available in one or more size options, such as but not limited to small, medium, large, and/or extra-large. In an embodiment, computing device 104 may calculate a consumable score 212 based on the serving size of a consumable element 208. Computing device 104 may then rank and display a first consumable element 208 and a second consumable element 216 as a function of the serving size. For instance and without limitation, a first consumable element 208 consisting of a meal containing chicken tacos served with guacamole and diced tomatoes may have a first consumable score 212 between 85-98 when selected with a small serving size, whereby the same first consumable element 208 may have a first consumable score 212 between 45-67 when selected with a large serving size. Computing device 104 may account for this and arrange a first consumable element 208 and a second consumable element 216 based on a selected serving size of a consumable element 208.

With continued reference to FIG. 2, arranging a first consumable element 208 and a second consumable element 216 may include selecting the first consumable element 208 for display in the display interface 228, eliminating the second consumable element 216, locating a third consumable element for display in the display interface 228, and arranging the first consumable element 208 and the third consumable element in the display interface 228. In an embodiment, second consumable element 216 may be eliminated, such as when second consumable score 220 is outside of an optimal range as specified within a representative profile 204. In yet another non-limiting example, second consumable element 216 may be eliminated such as when second consumable element 216 is unavailable for purchase and/or consumption. For example, a second consumable element 216 such as a fried haddock sandwich may be eliminated such as when there is a haddock shortage, and haddock is unavailable to source. In yet another non-limiting example, a second consumable element 216 such as an acai bowl topped with shredded coconut and strawberries may be eliminated such as when a particular vendor sells out of all available acai bowls on a particular day.

Figure 3B:
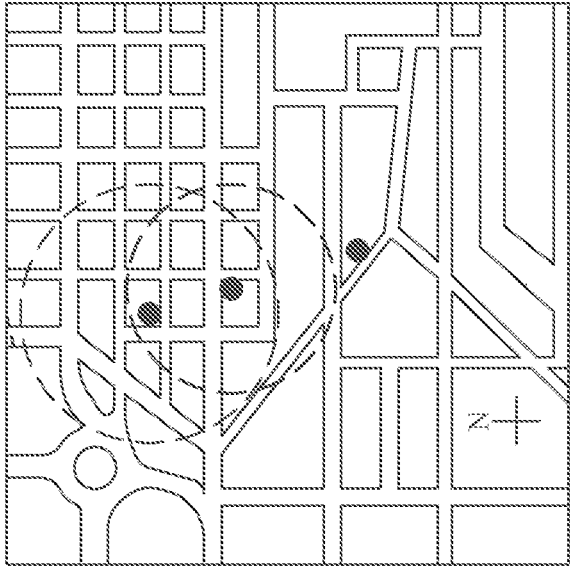
FIGS. 3A-3B is a diagrammatic representation of a non-limiting exemplary embodiment of radial search for locating alimentary element.
Figure 3B:
Figure 3A:
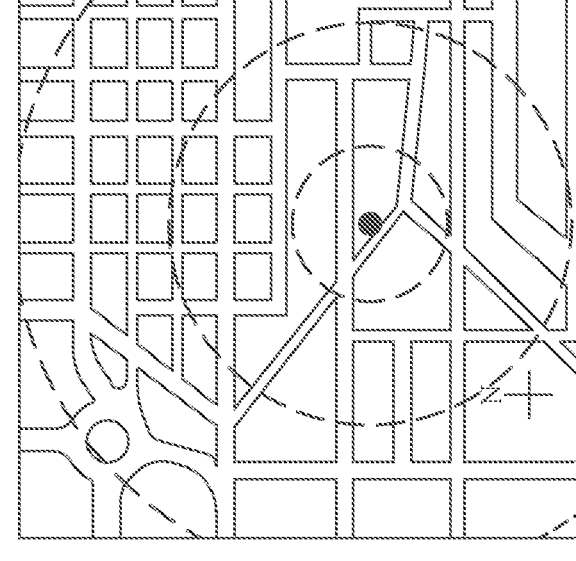

Referring now to FIG. 3A and FIG. 3B, an exemplary embodiment 300 of radial search for locating alimentary element originators is illustrated. Computing device 104 may use radial search machine-learning process 156 to locate alimentary element originators within a first radius. As depicted in FIG. 3A, radial search may select a first search radius to search based on a user location (black-shaded circle), wherein a first circle (dashed line) of area about the user is searched for a suitable originator. In the event that a suitable originator is not located, the radius may widen to larger radii concentric rings (larger dashed-line rings). Alternatively or additionally, as depicted in FIG. 3B, a first radius may be searched about a first local solution that is a first alimentary element originator (black-shaded circle) until a better solution is located (grey-shaded circle), and in the even the alimentary originator is not suitable, or the user indicates a different alimentary element, or the solution is otherwise not optimal, a second radius may be searched, which may locate additional originators (white circle). Each additional search radii may be larger or smaller than a previous search radius but may include a different search center.

Figure 4:
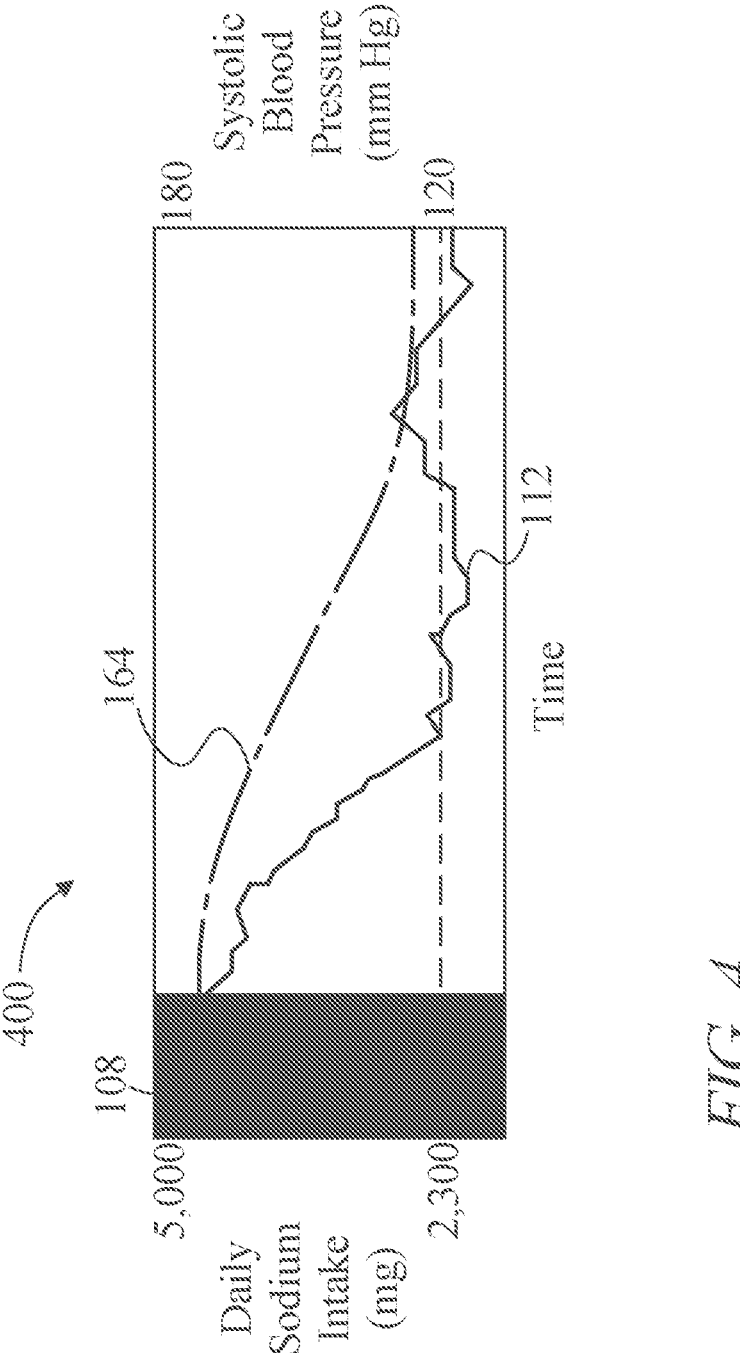
FIG. 4 is a diagrammatic representation of a non-limiting exemplary embodiment of biological extraction as a function of order chronicle.

Referring now to FIG. 4, a non-limiting exemplary embodiment 400 of predicted biological extraction 164 as a function of user order chronicle 112 is illustrated. User order chronicle 112 daily sodium intake from logged alimentary elements a user has ordered as a function of time is shown as a solid black line (graphed to left y-axis) about a daily recommended threshold of 2,300 mg sodium (depicted as dashed line at y=2,300 mg). System 100 may provide alternative alimentary elements 128 based on user order chronicle 112 with the intended effect of reducing daily sodium intake toward the daily recommended threshold to reduce blood pressure, wherein as a function of time a user may order alternative alimentary element 128 in place of alimentary elements more like temporally anterior alimentary elements. Systolic blood pressure (in mm Hg) of a user is depicted as a chain-dashed curve (graphed to right y-axis) as a function of time. System may determine a user's systolic blood pressure as a function of their order chronicle over time (for instance as over a several months-long period) and provide the predicted biological extraction 164 as a function of the order chronicle 112. In FIG. 4, biological extraction 108 and order chronicle 112 in the grey shaded region of the graph (leftmost portion) may represent data generated prior to a user began using system 100, including temporally anterior alimentary elements' sodium content and past user systolic blood pressure data. Biological extraction 164 to the right of the grey shaded region represents updated data points that are predicted from the order chronicle 112 that has been logged since user began using system 100. System 100 may use machine-learning processes, described herein, to determine how order chronicle 112 patterns, for instance sodium intake in milligrams (mg), may affect biological extraction parameters, for instance systolic blood pressure in millimeters mercury (mm Hg). Such relationships may be stored and/or retrieved from a database and used to inform further determinations by system 100, including predicted alimentary elements 124, alternative alimentary elements 128, originator locations, and the like.

Figure 5:
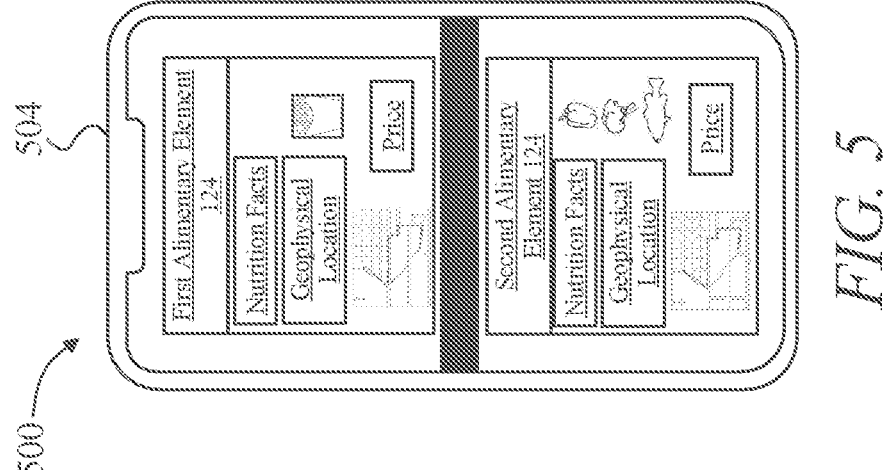
FIG. 5 is a diagrammatic representation of a non-limiting exemplary embodiment of a user device.

Referring now to FIG. 5, a non-limiting exemplary embodiment 500 of a user device generating a representation of a predicted alimentary element 124 and an alternative alimentary element 128. User device 504 may include a computing device 104. User device 504 may include a "smartphone", laptop, computer, tablet, internet-of-things (IOT) device, or the like, that is capable of performing system 100, as described herein. User device 504 may generate a representation of a predicted alimentary element 124, including any associated alimentary metrics, for instance and without limitation, the identity of an alimentary element originator, the geophysical location, nutrition facts, price, etc. In exemplary embodiments, user device 504 may use a mapping application or algorithm, for instance and without limitation, a web-based navigation application such, a mobile navigation application, or the like, that may communicate to a user a route for pick-up, take-out, dine-in, and the like, from ordering and/or obtaining an alimentary element.

Figure 6:
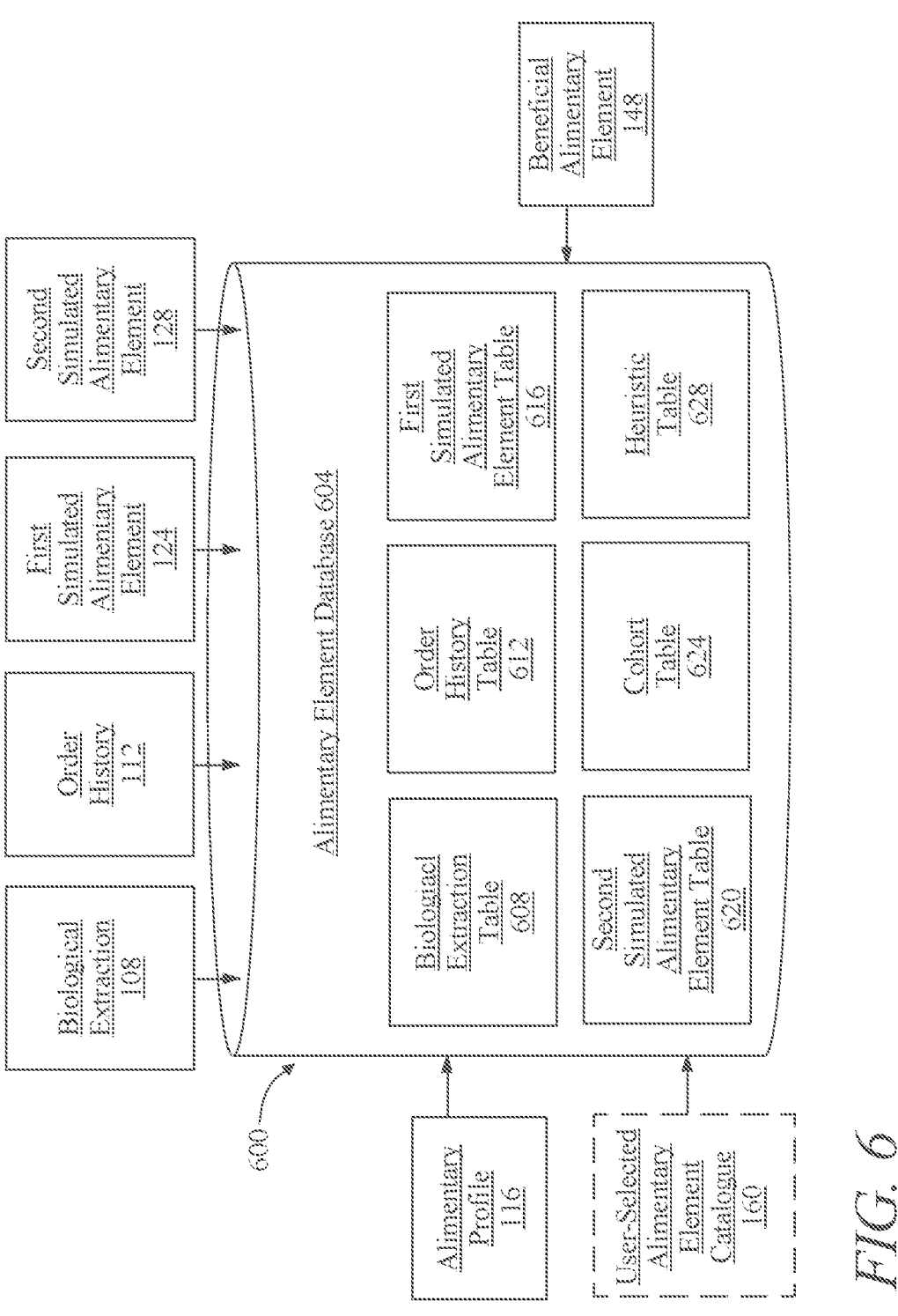
FIG. 6 is a block diagram illustrating a non-limiting exemplary embodiment of an alimentary element database.

Referring now to FIG. 6, a non-limiting exemplary embodiment 600 of an alimentary element database 604 is illustrated. Alimentary element database 604 may be implemented, without limitation, as a relational database, a key-value retrieval database such as a NOSQL database, or any other format or structure for use as a database that a person skilled in the art would recognize as suitable upon review of the entirety of this disclosure. Alimentary element database 604 may alternatively or additionally be implemented using a distributed data storage protocol and/or data structure, such as a distributed hash table and the like. Alimentary element database 604 may include a plurality of data entries and/or records, as described above. Data entries in an alimentary element database 604 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 6, alimentary element database 604 may include, without limitation, a biological extraction table 608, order chronicle table 612, predicted alimentary element table 616, alternative alimentary element table 620, cohort table 624, and/or heuristic table 628. Determinations by a machine-learning process, machine-learning model, ranking function, and/or mapping algorithm, may also be stored and/or retrieved from the alimentary element database 604, for instance in non-limiting examples a classifier describing a plurality of alimentary elements as it relates to an order chronicle 112, wherein a classifier is an identifier that denotes a subset of data that contains a heuristic and/or relationship, as may be useful to system 100 described herein. Determinations by a machine-learning process for selecting a region for determining an alimentary element originator and/or any associated, geophysical data, nutrition facts, item lists, prices, and the like, may also be stored and/or retrieved from the alimentary element database 604. As a non-limiting example, alimentary element database 604 may organize data according to one or more instruction tables. One or more alimentary element database 604 tables may be linked to one another by, for instance in a non-limiting example, common column values. For instance, a common column between two tables of alimentary element database 604 may include an identifier of a submission, such as a form entry, textual submission, global position system (GPS) coordinates, addresses, and the like, for instance as defined herein; as a result, a search by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 6, in a non-limiting embodiment, one or more tables of an alimentary element database 604 may include, as a non-limiting example, a biological extraction table 608, which may include categorized biological extraction data, as described above, including biological, physiological, chemical, etc., data. One or more tables may include order chronicle table 612, which may include a history of numerical values, GPS coordinates, addresses, timestamps, alimentary elements, and the like, for instance and without limitation, that system 100 may use to retrieve and/or store nutrition facts, prices, ingredient lists, and the like, associated with user order chronicle 112. One or more tables may include a predicted alimentary element table 616, which may store and/or organize the number and identity of alimentary elements, their nutrition facts, geolocation, price, and the like. One or more tables may include an alternative alimentary element table 620, which may store and/or organize the number and identity of alimentary elements, their nutrition facts, geolocation, price, and the like. One of more tables may include a cohort table 624, which may include user data from a plurality of users, organized into subsets of data, for instance and without limitation, using classifiers generated by classification machine-learning processes and/or algorithms. One or more tables may include, without limitation, a heuristic table 628, which may organize rankings, scores, models, outcomes, functions, numerical values, vectors, matrices, and the like, that represent determinations, optimizations, iterations, variables, and the like, include one or more inputs describing potential mathematical relationships between at least an element of user data and, for instance and without limitation, predicted alimentary elements, predicted biological extraction 164, and the like, as described herein.

Figure 7:
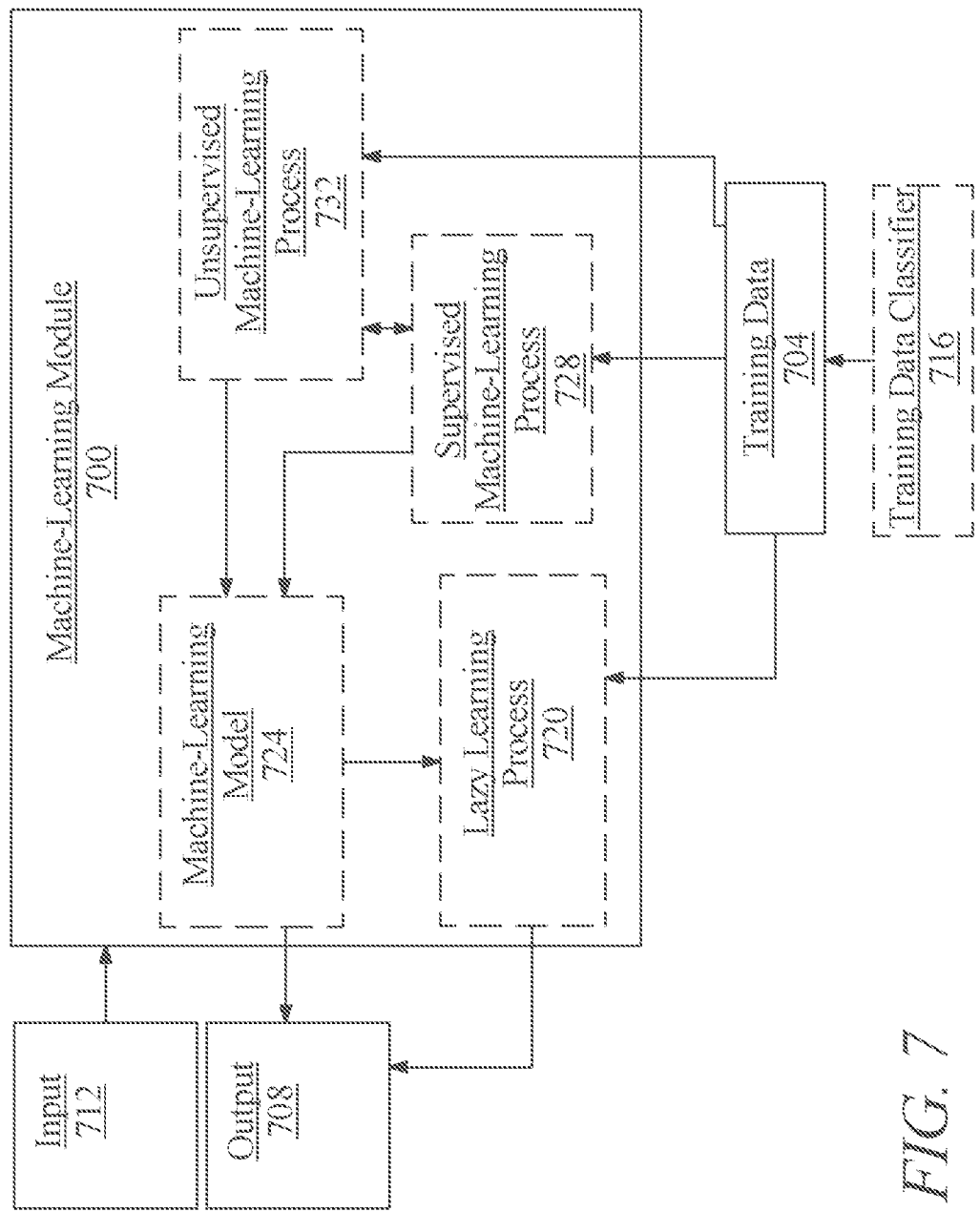
FIG. 7 is a block diagram illustrating a non-limiting exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail herein. Training data 704 used by machine-learning module 700 may correlate any input data as described in this disclosure to any output data as described in this disclosure.

Further referring to FIG. 7, training data may be filtered, sorted, and/or selected using one or more supervised and/or unsupervised machine-learning processes and/or models as described in further detail herein; such models may include without limitation a training data classifier 716. Training data classifier 716 may include a "classifier," which as used in this disclosure is a machine-learning model as defined herein, such as a mathematical model, neural net, or program generated by a machine learning algorithm known as a "classification algorithm," as described in further detail herein, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to elements that characterizes a sub-population, such as a subset of physical transfer paths and/or other analyzed items and/or phenomena for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of predictions may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail herein.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of predicted alimentary elements 124 and biological extraction 108 as described above as inputs, candidate alternative alimentary elements 128 as outputs, and a ranking function representing a desired form of relationship to be detected between inputs and outputs; ranking function may, for instance, seek to maximize the probability that a given input and/or combination of elements inputs is associated with a given output to minimize the probability that a given input is not associated with a given output. Ranking function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 7, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 704.

Figure 8:
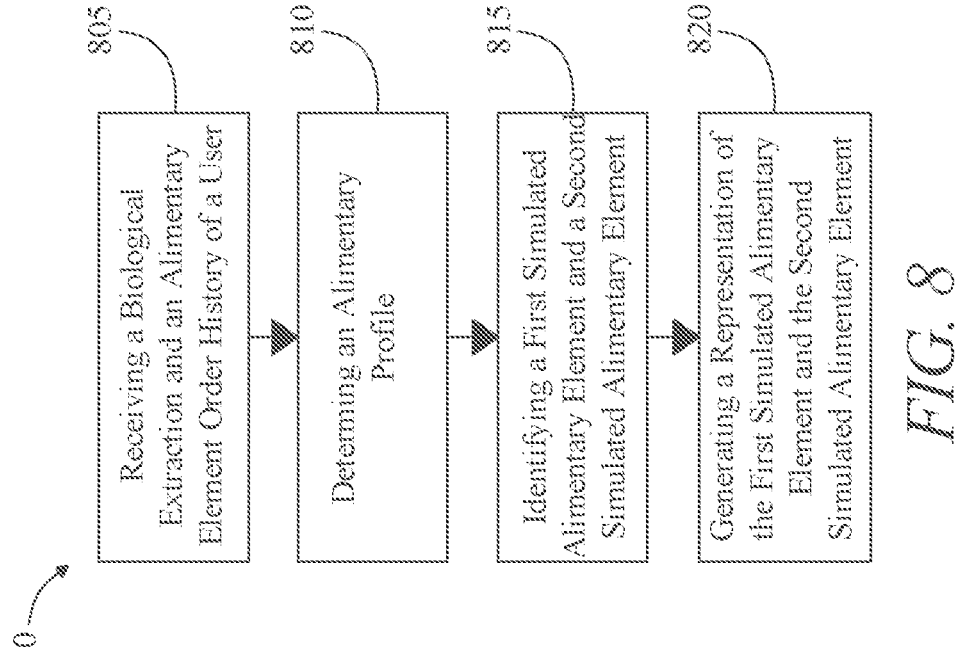
FIG. 8 is a flow diagram illustrating an exemplary workflow of a method for predicting alimentary element ordering based on biological extraction.

Referring now to FIG. 8, an exemplary embodiment of a method 800 for predicting alimentary element ordering based on biological extraction. At step 805, computing device 104 is configured for receiving a biological extraction 108 of a user and an alimentary element order chronicle 112 of a user. Receiving, by the computing device 104, the alimentary element order chronicle 112 may include generating training data using the alimentary element order chronical 112 to train the alimentary machine-learning model 120 for user alimentary element patterns; this may be implemented, without limitation, as described above in reference to FIGS. 1-7.

Continuing in reference to FIG. 8, at step 810, computing device 104 is configured for determining an alimentary profile 116, wherein determining the alimentary profile 116 includes training an alimentary machine-learning model 120 with training data that includes a plurality of entries wherein each entry relates user biological extraction 108 to alimentary element order chronicle, and generating the alimentary profile 116 as a function of the alimentary machine-learning model 120. Generating the alimentary machine-learning model 120 may include training a model to find at least a mathematical relationship between user alimentary element patterns and user biological extraction 108 data, wherein the mathematical relationship describes how user alimentary element patterns affect user biological extraction parameters; this may be implemented, without limitation, as described above in reference to FIGS. 1-7.

Continuing in reference to FIG. 8, at step 815, computing device 104 is configured for identifying, using the alimentary profile 116 and a predictive machine-learning process 132, a predicted alimentary element 124 and an alternative alimentary element 128, wherein generating includes determining, using the predictive machine-learning process 132 and the alimentary profile 116, the predicted alimentary element 124, wherein the predicted alimentary element 124 is a predictive alimentary element a user is expected to order, and generating, using the predicted alimentary element 124, the alternative alimentary element 128, wherein generating includes creating a classifier, using a classification machine-learning process, wherein the classifier contains alimentary element metrics of the predicted alimentary element 124, and ranking alimentary elements as a function of effect to a user's biological extraction 108 if substituted for the predicted alimentary element 124. Generating the predicted alimentary element 124 may include searching, using the alimentary profile 116 and the predictive machine-learning process 132, for a plurality of alimentary elements, wherein searching may include identifying alimentary element metrics present in the temporally anterior alimentary element, and locating the plurality of alimentary elements containing similar alimentary element metrics, calculating, using the alimentary element metrics, a first similarity metric 136 between the temporally anterior alimentary element and each of the plurality of alimentary elements, ranking, using a ranking machine-learning process 140, the plurality of alimentary elements based on the first similarity metrics 136, and selecting the predicted alimentary element 124 based on the ranking of the plurality of alimentary elements. Generating the alternative alimentary element 128 may include generating a sustenance machine-learning model 144, wherein the sustenance machine-learning model 144 is trained with training data that includes a plurality of entries wherein each entry relates user biological extraction 108 to alimentary elements that have beneficial effects on user biological extraction 108 parameters, searching, using the sustenance machine-learning model 144, for a plurality of beneficial alimentary elements 148, retrieving alimentary element metrics of the plurality of beneficial alimentary elements 148, calculating a second similarity metric 128 based on similarity of the alimentary element metrics of the plurality of beneficial alimentary elements 148 and the predicted alimentary element 124, ranking, using the ranking machine-learning process 140, the plurality of beneficial alimentary elements 148 based on the second similarity metric 152, and selecting the alternative alimentary element 128 based on the ranking, wherein the alternative alimentary element 128 is selected from the plurality of beneficial alimentary elements 148; this may be implemented, without limitation, as described above in reference to FIGS. 1-7.

Continuing in reference to FIG. 8, at step 820, computing device 104 is configured for generating a representation via a graphical user interface of the predicted alimentary element 124 and the alternative alimentary element 128 to a user. Providing the representation of the predicted alimentary element 124 and the alternative alimentary element 128 may include queuing the predicted alimentary element 124 and the alternative alimentary element 128 with an alimentary element originator, wherein queuing includes locating a first alimentary element originator with at least a metric that matches the predicted alimentary element 124 or the alternative alimentary element 128 within a first distance of a user, and addressing a user to order an alimentary element of the predicted alimentary element 124 and the alternative alimentary element 128. Computing device 104 may generate an audiovisual notification for addressing a user to select from a plurality of alternative alimentary elements. Addressing a user to order from a plurality of alternative alimentary elements may include using a radial search machine-learning process 156, wherein the radial search machine-learning process 156 determines a first distance, and searches the first distance for an alternative alimentary element originator, wherein the user can order at least an alternative alimentary element 128 from the alternative alimentary element originator. Generating, using the predictive machine-learning process 132, a user-indicated alimentary element log, wherein the predictive machine-learning process 132 includes selections of alimentary elements in the user-indicated alimentary element log in real-time. Generating, using the predictive machine-learning process 132, a user-indicated alimentary element log may include building a user-indicated alimentary element catalogue 160 and generating, using the alimentary machine-learning model 120, at least a predicted biological extraction 164 datum of the user as a function of the user-indicated alimentary element catalogue 160; this may be implemented, without limitation, as described above in reference to FIGS. 1-7.

Figure 9:
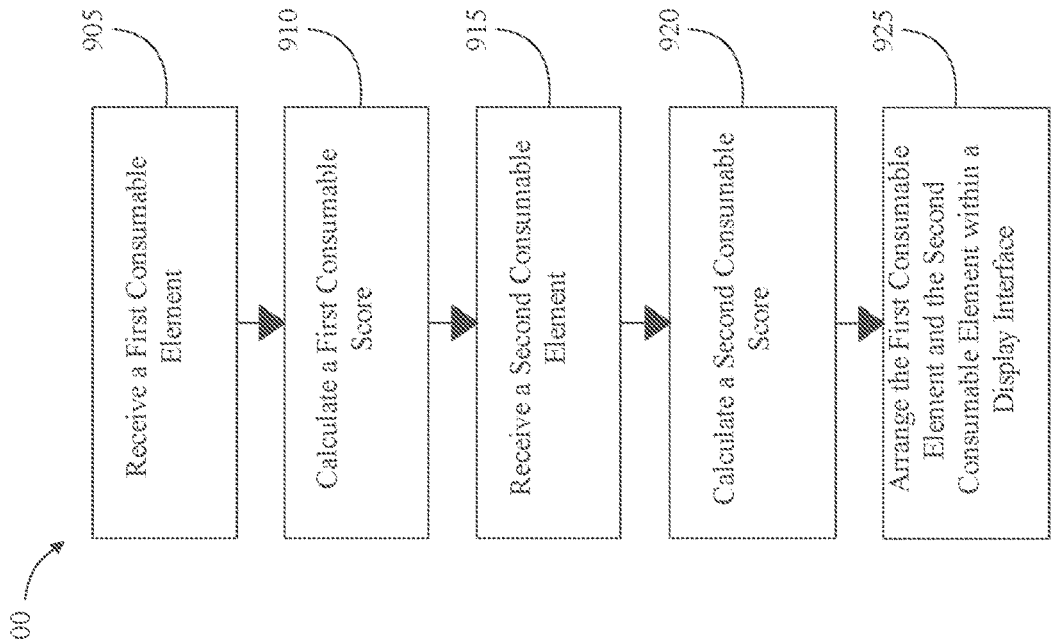
FIG. 9 is a flow diagram illustrating an exemplary workflow of a method of arranging consumable elements within a display interface.

Now referring to FIG. 9, a method 900 of arranging consumable elements within a display interface is illustrated. At step 905, computing device 104 receives a first consumable element 208. A consumable element 208 includes any consumable element 208 as described above in more detail in reference to FIGS. 1-8. Computing device 104 may receive a first consumable element 208 utilizing any network methodology as described herein. Receiving a first consumable element 208 may include receiving at an image capture device located on computing device 104, a photograph of a first consumable element 208. This may be performed utilizing any network methodology as described above in more detail.

With continued reference to FIG. 9, at step 910, computing device 104 calculates a first consumable score 212 as a function of a first consumable element 208. A first consumable score 212 includes any consumable score as described above in more detail in reference to FIGS. 1-8. A first consumable score 212 may be calculated utilizing any methodology as described above in more detail in reference to FIGS. 1-8. Calculating a first consumable score 212 may include receiving a previous consumable score as a function of a score database, and calculating the first consumable score 212 as a function of the previous consumable score. Receiving a previous consumable score may include identifying a consumable interval and receiving the previous consumable score as a function of the consumable interval. Calculating a first consumable score 212 may include retrieving an input associated to a first consumable element 208 and calculating the first consumable score 212 as a function of the input. This may be performed utilizing any of the methodologies as described above in more detail in reference to FIGS. 1-8.

With continued reference to FIG. 9, at step 915, computing device 104 receives a second consumable element 216. Second consumable element 216 includes any consumable element 208 as described above in more detail in reference to FIGS. 1-8. Second consumable element may be received utilizing any network methodology as described herein.

With continued reference to FIG. 9, at step 920, computing device 104 calculates a second consumable score 220 as a function of a second consumable element 216. This may be performed utilizing any methodology as described above in more detail in reference to FIGS. 1-8.

With continued reference to FIG. 9, at step 925, computing device 104 arranges first consumable element 208 and second consumable element 216 within display interface 228 as a function of a ranking process. Ranking process may include any ranking process as described above in more detail in reference to FIGS. 1-8. Arranging first consumable element 208 and second consumable element 216 may include ranking first consumable element 208 and second consumable element 216 as a function of a nutritional impact. In an embodiment, a nutritional impact may be determined from a representative profile. This may be performed utilizing any methodology as described above in more detail in reference to FIGS. 1-8. Computing device 104 may select a representative profile as a function of a user trait, compare a first consumable score 212 and a second consumable score 220 to the representative profile and rank the first consumable score 212 and the second consumable score 220 as a function of the representative profile. This may be performed utilizing any methodology as described above in more detail in reference to FIGS. 1-8. Arranging a first consumable element 208 and a second consumable element 216 may include ranking the first consumable element 208 and the second consumable element 216 as a function of a serving size. A serving size includes any serving size as described above in more detail in reference to FIGS. 1-8. In an embodiment, a serving size may be utilized to calculate a consumable score 212. Arranging first consumable element 208 and second consumable element 216 may include selecting first consumable element 208 for display in display interface 228, eliminating second consumable element 216, locating a third consumable element for display in display interface, and arranging first consumable element and the third consumable element in display interface 228. This may be performed utilizing any methodology as described above in more detail in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
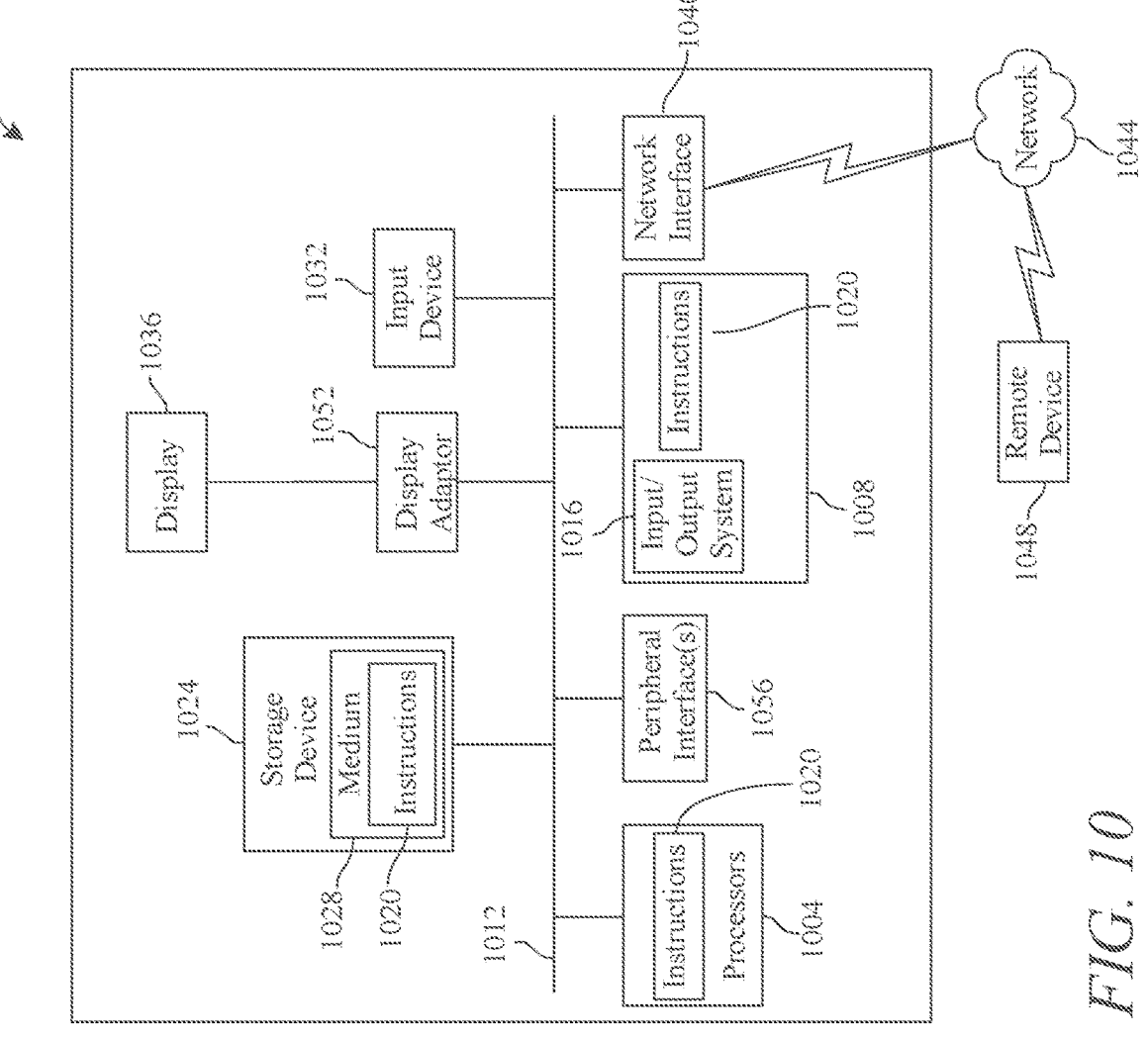
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for arranging consumable elements within a display interface, the system comprising:
   a computing device, wherein the computing device is configured to:
   receive a biological extraction of a user;
   receive a first consumable element and a first alimentary profile;
   identify a first nutritional impact as a function of the first consumable element;
   calculate a first consumable score as a function of the first nutritional impact and the first alimentary profile;
   receive a second consumable element and a second alimentary profile;
   identify a second nutritional impact as a function of the second consumable element;
   calculate a second consumable score as a function of the second nutritional impact and the second alimentary profile;
   generate a predicted biological extraction of the user as a function of the first consumable score and the second consumable score, wherein the predicted biological extraction comprises a short-term predictive element representing a prediction of immediate changes that consumption of each consumable element will have on the biological extraction and a long-term predictive element representing a prediction of prolonged changes that consumption of each consumable element will have on the biological extraction; and
   arrange the first consumable element and the second consumable element within a display interface as a function of the predicted biological extraction using a ranking process.

2. The system of claim 1, wherein receiving the first consumable element further comprises receiving at an image capture device located on the computing device, a photograph of the first consumable element.

3. The system of claim 1, wherein calculating the first consumable score further comprises:
   receiving a previous consumable score as a function of a score database; and
   calculating the first consumable score as a function of the previous consumable score.

4. The system of claim 3, wherein receiving the previous consumable score further comprises:
   identifying a consumable interval; and
   receiving the previous consumable score as a function of the consumable interval.

5. The system of claim 1, wherein calculating the first consumable score further comprises:
   retrieving an input associated to the first consumable element; and
   calculating the first consumable score as a function of the input.

6. The system of claim 1, wherein arranging the first consumable element and the second consumable element further comprises:

selecting a representative profile as a function of a user trait;

comparing the first consumable score and the second consumable score to the representative profile; and ranking the first consumable score and the second consumable score as a function of the representative profile.

7. The system of claim 1, wherein arranging the first consumable element and the second consumable element further comprises ranking the first consumable element and the second consumable element as a function of a serving size.

8. The system of claim 1, wherein arranging the first consumable element and the second consumable element further comprises:

selecting the first consumable element for display in the user interface;

eliminating the second consumable element;

locating a third consumable element for display in the display interface; and arranging the first consumable element and the third consumable element in the display interface.

9. The system of claim 1, wherein arranging the first consumable element and the second consumable element further comprises ranking the first consumable element and the second consumable element as a function of the first nutritional impact and the second nutritional impact.

10. A method of arranging consumable elements within a display interface, the method comprising:

receiving, by a computing device, a biological extraction of a user;

receiving by a computing device, a first consumable element and a first alimentary profile;

identifying by the computing device, a first nutritional impact as a function of the first consumable element;

calculating by the computing device, a first consumable score as a function of the first nutritional impact and the first alimentary profile;

receiving by the computing device, a second consumable element and a second alimentary profile;

identifying by the computing device, a second nutritional impact as a function of the second consumable element;

calculating by the computing device, a second consumable score as a function of the second nutritional impact and the second alimentary profile;

generating, by the computing device, a predicted biological extraction of the user as a function of the first consumable score and the second consumable score, wherein the predicted biological extraction comprises a short-term predictive element representing a prediction of immediate changes that consumption of each consumable element will have on the biological extraction and a long-term predictive element representing a prediction of prolonged changes that consumption of each consumable element will have on the biological extraction; and arranging by the computing device, the first consumable element and the second consumable element within a display interface as a function of the predicted biological extraction using a ranking process.

11. The method of claim 10, wherein receiving the first consumable element further comprises receiving at an image capture device located on the computing device, a photograph of the first consumable element.

12. The method of claim 10, wherein calculating the first consumable score further comprises:

receiving a previous consumable score as a function of a score database; and calculating the first consumable score as a function of the previous consumable score.

13. The method of claim 12, wherein receiving the previous consumable score further comprises:

identifying a consumable interval; and receiving the previous consumable score as a function of the consumable interval.

14. The method of claim 10, wherein calculating the first consumable score further comprises:

retrieving an input associated to the first consumable element; and calculating the first consumable score as a function of the input.

15. The method of claim 10, wherein arranging the first consumable element and the second consumable element further comprises:

selecting a representative profile as a function of a user trait;

comparing the first consumable score and the second consumable score to the representative profile; and ranking the first consumable score and the second consumable score as a function of the representative profile.

16. The method of claim 10, wherein arranging the first consumable element and the second consumable element further comprises ranking the first consumable element and the second consumable element as a function of a serving size.

17. The method of claim 10, wherein arranging the first consumable element and the second consumable element further comprises:

selecting the first consumable element for display in the user interface;

eliminating the second consumable element;

locating a third consumable element for display in the display interface; and arranging the first consumable element and the third consumable element in the display interface.

18. The method of claim 10, wherein arranging the first consumable element and the second consumable element further comprises ranking the first consumable element and the second consumable element as a function of the first nutritional impact and the second nutritional impact.

* * * * *